US009170849B2

(12) United States Patent
Calder et al.

(10) Patent No.: US 9,170,849 B2
(45) Date of Patent: Oct. 27, 2015

(54) MIGRATION OF TASK TO DIFFERENT POOL OF RESOURCES BASED ON TASK RETRY COUNT DURING TASK LEASE

(75) Inventors: Bradley Gene Calder, Bellevue, WA (US); Ju Wang, Redmond, WA (US); Vaman Bedekar, Redmond, WA (US); Sriram Sankaran, Bellevue, WA (US); Marvin McNett, II, Redmond, WA (US); Pradeep Kumar Gunda, Bellevue, WA (US); Yang Zhang, Issaquah, WA (US); Shyam Antony, Bellevue, WA (US); Kavitha Manivannan, Redmond, WA (US); Arild E. Skjolsvold, Kenmore, WA (US); Hemal Khatri, Redmond, WA (US)

(73) Assignee: MICROSOFT TECHNOLOGY LICENSING, LLC, Remond, WA (US)

( * ) Notice: Subject to any disclaimer, the term of this patent is extended or adjusted under 35 U.S.C. 154(b) by 235 days.

(21) Appl. No.: 13/346,303

(22) Filed: Jan. 9, 2012

(65) Prior Publication Data
US 2013/0179881 A1 Jul. 11, 2013

(51) Int. Cl.
G06F 9/455 (2006.01)
G06F 9/50 (2006.01)

(52) U.S. Cl.
CPC ............ *G06F 9/5072* (2013.01); *G06F 9/5088* (2013.01); *G06F 2209/5011* (2013.01); *G06F 2209/5022* (2013.01)

(58) Field of Classification Search
CPC ... G06F 9/50; G06F 2009/4557; G06F 9/455; G06F 9/5072; G06F 9/5088
See application file for complete search history.

(56) References Cited

U.S. PATENT DOCUMENTS 5,291,597 A 3/1994 Shorter et al.
5,392,430 A 2/1995 Chen
(Continued)

FOREIGN PATENT DOCUMENTS

| JP | 2003533766 | 11/2003 |
| KR | 1020030086298 | 11/2003 |
| KR | 10200900631 | 6/2009 |

OTHER PUBLICATIONS

Notification of Transmittal of the International Search Report and the Written Opionion of the International Searching Authority, or the Declaration, in PCT/US2013/020442 mailed Apr. 16, 2013, 11 pages.

(Continued)

*Primary Examiner* — Meng An
*Assistant Examiner* — James J Lee
(74) *Attorney, Agent, or Firm* — Ben Tabor; Kate Drakos; Micky Minhas

(57) ABSTRACT

Systems and methods are presented for providing resources by way of a platform as a service in a distributed computing environment to perform a job. Resources of the system, job performing on the system, and schedulers of the jobs performing on the system are decoupled in a manner that allows a job to easily migrate among resources. It is contemplated that the migration of jobs from a first pool of resource to a second pool of resource is performed by the system without human intervention. The migration of a job may utilize different schedulers for the different resources. Further, it is contemplated that a pool of resources may automatically allocate additional or fewer resources in response to a migration of a job.

20 Claims, 13 Drawing Sheets

(56) References Cited

U.S. PATENT DOCUMENTS

| | | | |
|---|---|---|---|
| 5,832,262 A | 11/1998 | Johnson et al. | |
| 6,223,202 B1* | 4/2001 | Bayeh | 718/102 |
| 6,865,591 B1 | 3/2005 | Garg | |
| 7,574,507 B2 | 8/2009 | Birkestrand | |
| 7,739,685 B2 | 6/2010 | Vaddagiri | |
| 7,870,044 B2 | 1/2011 | Robertson | |
| 8,065,676 B1 | 11/2011 | Sahai et al. | |
| 8,131,616 B2 | 3/2012 | Semret et al. | |
| 8,739,170 B1* | 5/2014 | Gupta et al. | 718/104 |
| 8,856,797 B1 | 10/2014 | Siddiqui et al. | |
| 8,930,946 B1* | 1/2015 | Hyman et al. | 718/1 |
| 2002/0013802 A1 | 1/2002 | Mori et al. | |
| 2003/0083926 A1 | 5/2003 | Semret et al. | |
| 2004/0006625 A1 | 1/2004 | Saha et al. | |
| 2005/0050545 A1 | 3/2005 | Moakley | |
| 2005/0228822 A1 | 10/2005 | Wason | |
| 2008/0189700 A1 | 8/2008 | Schmidt et al. | |
| 2008/0288962 A1 | 11/2008 | Greifeneder et al. | |
| 2009/0276771 A1 | 11/2009 | Nickolov et al. | |
| 2009/0320023 A1* | 12/2009 | Barsness et al. | 718/100 |
| 2010/0042670 A1 | 2/2010 | Kamalakantha et al. | |
| 2010/0058036 A1 | 3/2010 | Degenaro et al. | |
| 2010/0058342 A1 | 3/2010 | Machida | |
| 2010/0153945 A1 | 6/2010 | Bansal | |
| 2010/0198972 A1 | 8/2010 | Umbehocker | |
| 2010/0306566 A1 | 12/2010 | Dehaan et al. | |
| 2010/0318454 A1 | 12/2010 | Warncke et al. | |
| 2011/0078303 A1 | 3/2011 | Li et al. | |
| 2011/0173038 A1 | 7/2011 | Moon et al. | |
| 2011/0173637 A1 | 7/2011 | Brandwine et al. | |
| 2011/0185063 A1 | 7/2011 | Head et al. | |
| 2011/0214124 A1 | 9/2011 | Ferris et al. | |
| 2011/0225299 A1 | 9/2011 | Nathuji et al. | |
| 2011/0231680 A1 | 9/2011 | Padmanabhan | |
| 2011/0252420 A1 | 10/2011 | Tung et al. | |
| 2011/0296000 A1 | 12/2011 | Ferris et al. | |
| 2011/0296052 A1 | 12/2011 | Guo et al. | |
| 2011/0321051 A1 | 12/2011 | Rastogi | |
| 2012/0011077 A1 | 1/2012 | Bhagat | |
| 2012/0117571 A1 | 5/2012 | Davis et al. | |
| 2012/0137006 A1 | 5/2012 | Minato et al. | |
| 2012/0159234 A1 | 6/2012 | Mehta et al. | |
| 2012/0239739 A1 | 9/2012 | Manglik et al. | |
| 2012/0284408 A1* | 11/2012 | Dutta et al. | 709/226 |
| 2012/0311575 A1 | 12/2012 | Song | |
| 2013/0031545 A1* | 1/2013 | Choudhury et al. | 718/1 |
| 2013/0061220 A1 | 3/2013 | Gnanasambandam et al. | |
| 2013/0061221 A1 | 3/2013 | Anderson et al. | |
| 2013/0091376 A1 | 4/2013 | Raspudic et al. | |
| 2013/0111471 A1* | 5/2013 | Chandrasekaran | 718/1 |
| 2013/0174168 A1 | 7/2013 | Abuelsaad et al. | |
| 2013/0275975 A1 | 10/2013 | Masuda et al. | |

OTHER PUBLICATIONS

Notification of Transmittal of the International Search Report and the Written Opinion of the International Searching Authority, or the Declaration, in PCT/US2013/020447 mailed Apr. 26, 2013, 10 pages.

Qi Zhang, et al., "Dynamic Resource Allocation for Spot Markets in Cloud Computing Environments," In: Utility and Cloud Computing (UCC), 2011 Fourth IEEE International Conference, pp. 178-185, Dec. 5-8, 2011. See abstract, sections 2, 3.

Lucas Simarro et al. "Dynamic Placement of Virtual Machines for Cost Optimimization in Multi-Cloud Environments," In: High Performance Computing and Simulation (HPCS), 2011 International Conference, Jul. 4-8, 2011, see pp. 1-7.

Notification of Transmitall of the International Search Report and the Written Opinion of the International Searching Authority, or the Declaration in PCT/US13/020443 mailed Apr. 29, 2013, 10 pages.

Notification of Transmittal of the International Search Report and the Written Opinion of the International Searching Authority, or the Declaration, in PCT/US2012/071890 mailed Apr. 1, 2013, 11 pages.

"Cloud Backup and Disaster Recovery for the Rest of Us", Retrieved on: Nov. 24, 2011, 1 page Available at: unitrends.com/cloud-backup-overview.html.

"ProActive Scheduling", Published on: Sep. 2009, 5 pages Available at: activeeon.com/brochures/ProActiveSchedulingDS.pdf.

"About Red Hat", Published on: Aug. 25, 2010, 2 pages Available at: redhat.com/about/news/blog/red-hat-paas-build-any-way-deploy-anywhere/.

Cao, et al., "BSM: A Scheduling Algorithm for Dynamic Jobs Based on Economics Theory", In Proceedings of Fifth International Conference Grid and Cooperative Computing, Oct. 2006, pp. 62-65.

Li, et al., "Feedback Dynamic Algorithms for Preemptable Job Scheduling in Cloud Systems", In Proceedings of IEEE/WIC/ACM International Conference on Web Intelligence and Intelligent Agent Technology, Nov. 1, 2010, pp. 561-564.

Mao, et al., "Cloud Auto-scaling with Deadline and Budget Constraints", In Proceedings of 11th IEEE/ACM International Conference on Grid Computing, Oct. 28, 2010, pp. 41-48.

"Zero Effort Platform and Application Multi-Tenancy", Nov. 23, 2011, apprenda.com/paas/features/multi-tenancy/.

Walters, et al., "Enabling Interactive Jobs in Virtualized Data Centers (Extended Abstract)", In 1st Workshop on Cloud Computing and Its Applications, 2008, 5 pages.

Wei, et al., "Aneka Cloud Application Platform and Its Integration with Windows Azure," 2011 buyya.com/papers/Aneka-AzurePlatform.pdf.

Valeri, "Load Balancing for Disaster Recovery," Feb. 14, 2011, content.dell.com/us/ententerprise/d/large-business/load-balancing-disaster.

"Elastic Load Balancing," Aug. 15, 2011 awsdocs.s3.amazonaws.com/ElasticLoadBalancing/latest/elb-dg.pdf.

Sotomayor, et al., "Combining Batch Execution and Leasing Using Virtual Machines," HPDC '08 Proceedings of the 17th international symposium on High performance distributed computing, Jun. 2008, pp. 87-96.

Waldspurger, "Memory Resources Management in VMware ESX Server," ACM SIGOPS Operating Systems Review—OSDI '02: Proceedings of the 5th Symposium on Operating systems design and implementation, Dec. 2002, pp. 181-194.

Weng, et al., "The Hybrid Scheduling Framework for Virtual Machine Systems," VEE '0 Proceedings of the 2009 ACM SIGPLAN/SIGOPS international conference on Virtual execution environments, Mar. 2009, pp. 111-120.

Iqbal, et al., "Job Scheduling in HPC Clusters," Feb. 2005 dell.com/downloads/global/power/ps1q05-20040135-fang.pdf.

Sandholm, et al., "Dynamic Proportional Share Scheduling in Hadoop," JSSPP' 10 Proceedings of the 15th international conference on Job scheduling strategies for parallel processing, 2010, pp. 110-131.

Costa, et al., "Just in Time Clouds: Enabling Highly-Elastic Public Clouds over Law Scale Amortized Resources," 2010 webcache.googleusercontent.com/search?q=cache:.Isd.ufcg.edu.br/realtorios_tecnicosTR-3.pdf.

Marshall, et al., "Improving Utilization of Infrastructure Clouds,"11th IEEE/ACM International Conference on Cluster, Cloud, ,and Grid Computing (CCGrid), May 26, 2011, pp. 205-214.

Vanmechelen, et al., " Combining Futures and Spot Markets: A Hybrid Market Approach to Economic Grid Resource Mangement," journal of Grid Computing, vol. 9, Jan. 11, 2011, pp. 81-94.

Ben-Yehuda, et al., "Deconstructing Amazon EC2 Spot Instance Pricing," Technion Israel Institute of Technology, Tech. Rep. CS-2011-09.

Voorsluys, et al., "Reliable Provisioning of Spot Instances for Compute-Intensive Applications," Nov. 23, 2011 arxiv.org/PS_cache/arxiv/pdf/111011110.5969va.pdf.

Kommalapati, "Windows Azure Platform for Enterprises," Nov. 23, 2011 msdn.microsoft.com/en-us/magazinefee309870.aspx.

Radenac, et al., "Resource Management Systems for Distributed High Performance Computing," Feb. 4, 2011 coop.gforge,inria.fr/lib/exe/fetch.php?media=d2.2.pdf.

Ashraf, et al., "Cloud Software Program," Jun. 27, 2010 cloudsoftwareprogram.org/rs/1801/9ed65124-0873-400e-bc8a-

(56) References Cited

OTHER PUBLICATIONS

9c85c1f1afa8/d2e/filename/d 1-1-1-techreportcloudcomputingtechnologies.pdf.

Rajan, "Dynamic Scaling and Elasticity—Windows Azure vs. Amazon EC2," Nov. 23, 2011 cloudcomputing.sys-com/node/1626508.

Chen, et al., "Using Cloud for Research: a Technical Review," In Tecires Report, School of Electronic and Computer Science, University of Southampton, Jun. 2010.

Non-Final Office Action in U.S. Appl. No. 13/346,334 mailed Oct. 23, 2013, 36 pages.

Non-Final Office Action in U.S. Appl. No. 13/346,348 electronically sent on Mar. 27, 2014, 49 pages.

Notice of Allowance dated Apr. 14, 2014 in U.S. Appl. No. 13/346,416, 12 pages.

Final Office Action dated Apr. 23, 2014 in U.S. Appl. No. 13/346,334, 17 pages.

Non-Final Office Action dated Aug. 1, 2014 in U.S. Appl. No. 13/346,375, 14 pages.

Notice of Allowance dated Aug. 4, 2014 in U.S. Appl. No. 13/346,416, 5 pages.

Final Office Action dated Aug. 28, 2014 in U.S. Appl. No. 13/346,348, 18 pages.

Final Office Action dated May 15, 2015 in U.S. Appl. No. 13/346,375, 33 pages.

Non-Final Office Action dated Jul. 2, 2015 in U.S. Appl. No. 13/346,334, 14 pages.

Non-Final Office Action dated Jul. 14, 2015 in U.S. Appl. No. 13/346,348, 16 pages.

"Search Report Received in European Patent Application No. 13736170.5", Mailed Date: Jul. 20, 2015, 9 pages.

\* cited by examiner

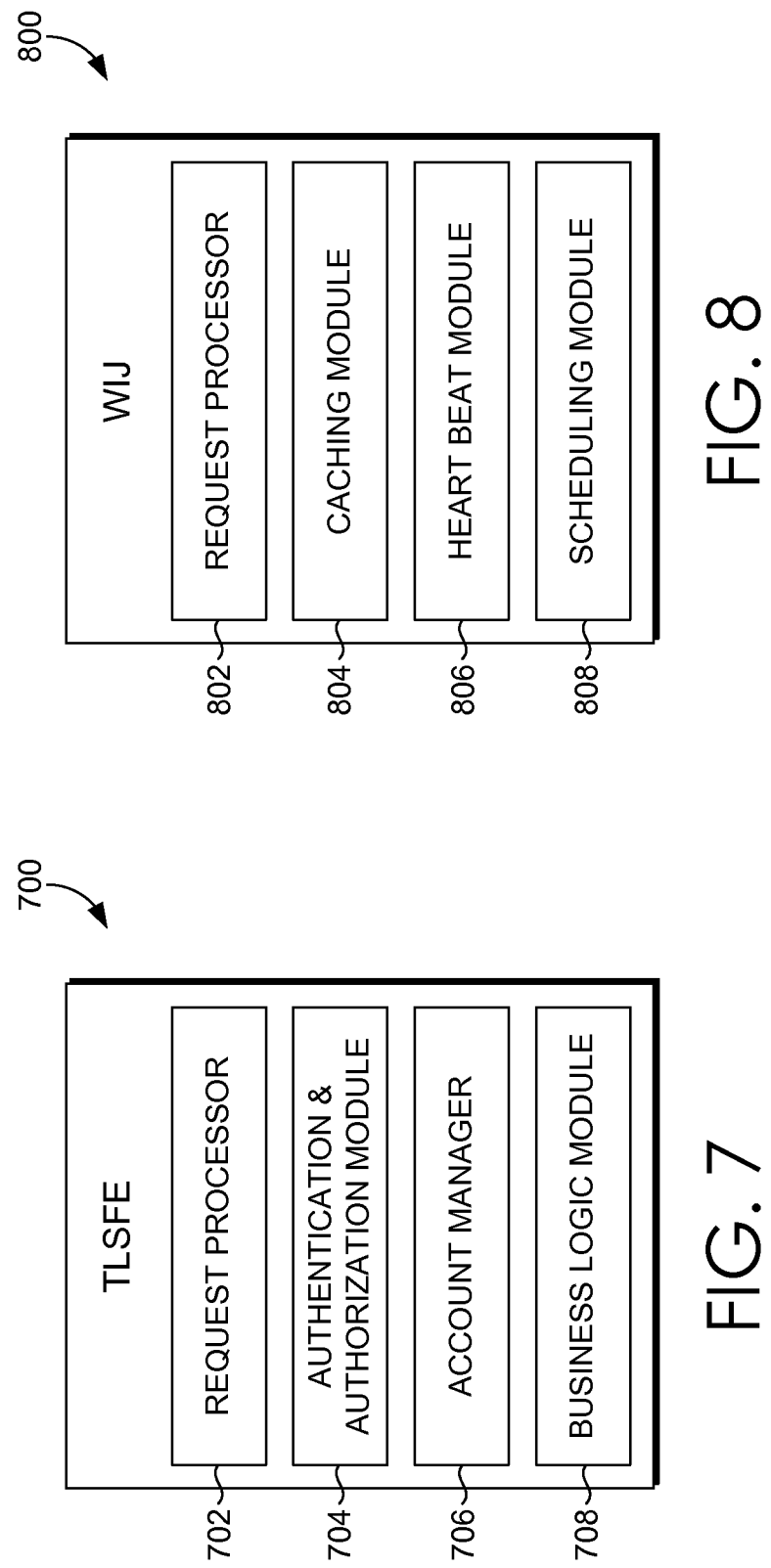

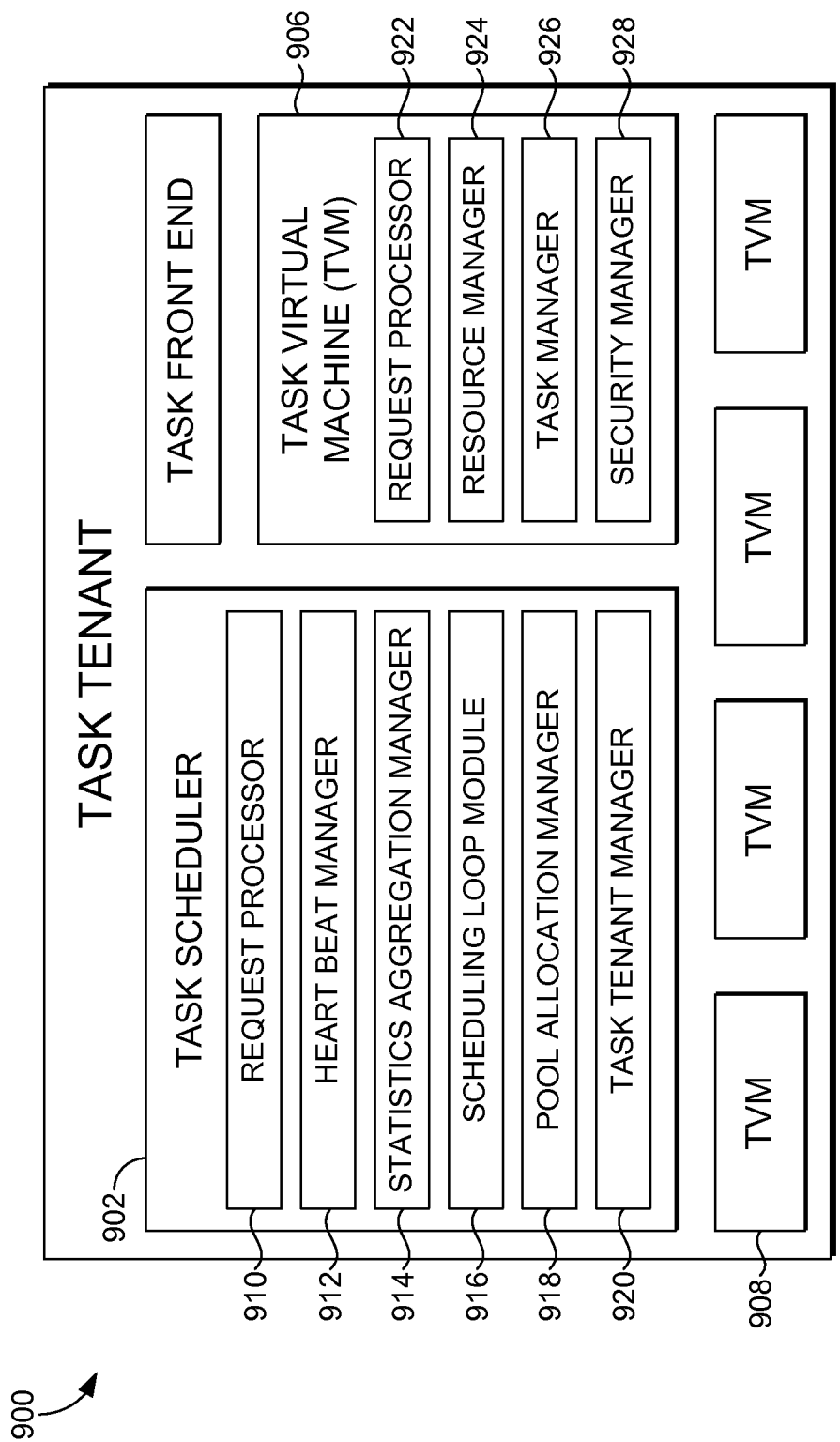

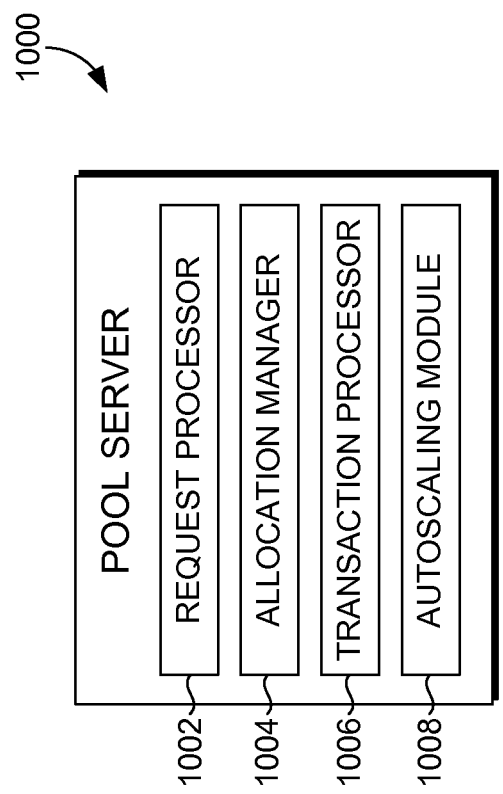

MIGRATION OF TASK TO DIFFERENT POOL OF RESOURCES BASED ON TASK RETRY COUNT DURING TASK LEASE

CROSS-REFERENCE TO RELATED APPLICATIONS

This application is related in subject matter to the following concurrently filed U.S. Patent Applications: U.S. patent application Ser. No. 13/346,334, entitled "PLATFORM AS A SERVICE JOB SCHEDULING," U.S. patent application Ser. No. 13/346,416, entitled "ASSIGNMENT OF RESOURCES IN VIRTUAL MACHINE POOLS," U.S. patent application Ser. No. 13/346,375, entitled "PRICING OF RESOURCES IN VIRTUAL MACHINE POOLS," and, U.S. patent application Ser. No. 13/346,348, entitled "PAAS HIERARCHIAL SCHEDULING AND AUTO-SCALING," the entireties of the aforementioned applications are incorporated by reference herein.

BACKGROUND

Conventional methods for performing large-scale computational jobs often required a user to actively manage tenants in a distributed environment and to manage queues for the jobs. This active involvement of the user may inhibit the ability of the job to span large resource clusters and to scale the use of those clusters in an efficient manner. Further, jobs may conventionally be created in a manner that the job, the resources used for completing the job, and the scheduling of the job on the resources are tightly coupled to prevent efficient migration of the job in response to a failure or load balancing.

SUMMARY

In various embodiments, systems and methods are presented for providing resources by way of a platform as a service in a distributed computing environment to perform a job. Resources of the system, job performing on the system, and schedulers of the jobs performing on the system are decoupled in a manner that allows a job to easily migrate among resources. It is contemplated that the migration of jobs from a first pool of resource to a second pool of resource is performed by the system without human intervention. The migration of a job may utilize different schedulers for the different resources. Further, it is contemplated that a pool of resources may automatically allocate additional or fewer resources in response to a migration of a job.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein:

FIG. 7 depicts a block diagram illustrating an exemplary task location service front end ("TLSFE"), in accordance with aspects of the present invention;

FIG. 8 depicts a block diagram illustrating an exemplary work item/job scheduler ("WIJ"), in accordance with aspects of the present invention;

FIG. 9 depicts a block diagram illustrating a task tenant, in accordance with aspects of the present invention;

FIG. 10 depicts a block diagram illustrating an exemplary pool server, in accordance with aspects of the present invention;

DETAILED DESCRIPTION

Figure 1:
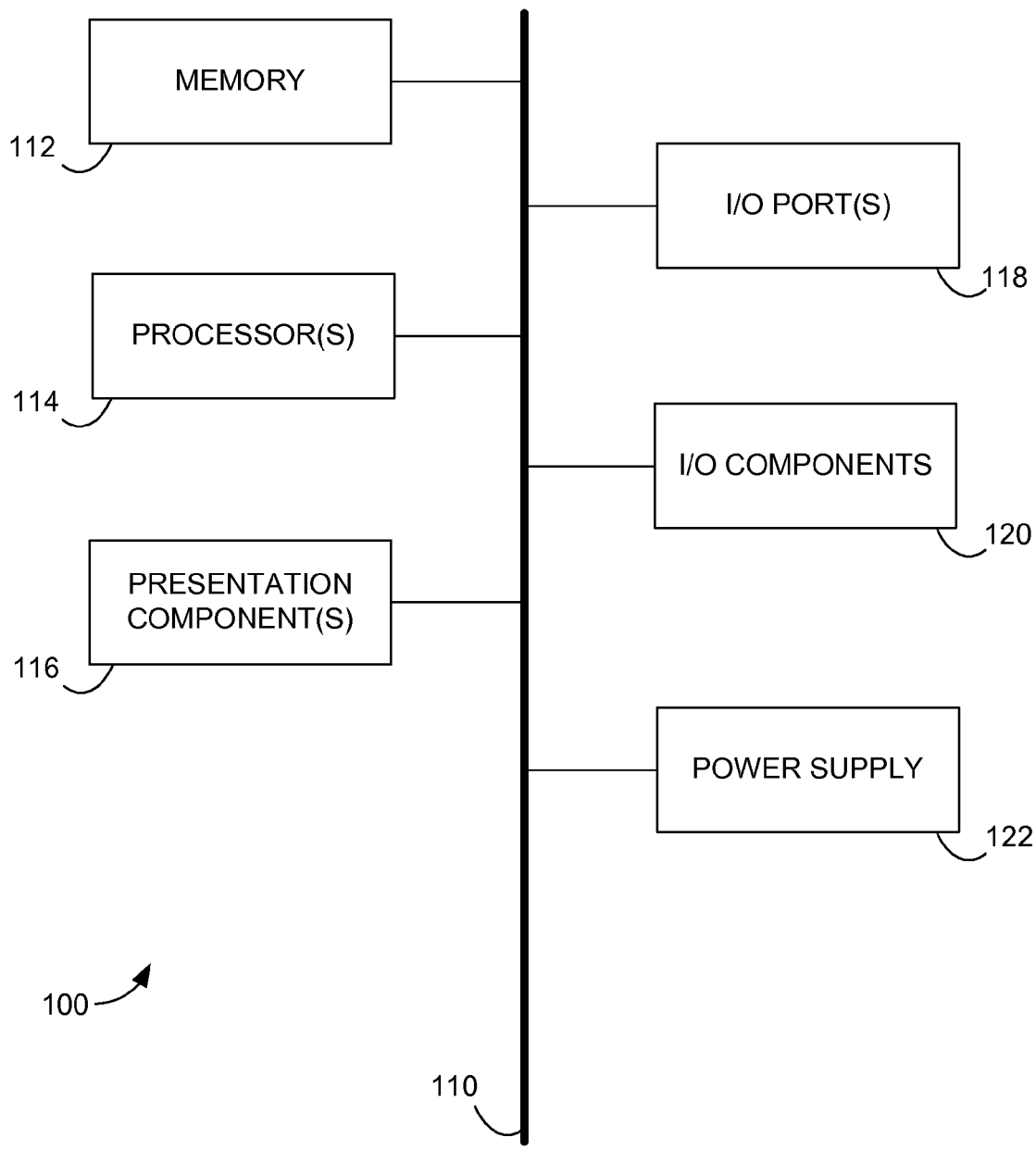
FIG. 1 depicts exemplary operating environment suitable for implementing embodiments of the present invention, in accordance with aspects of the present invention.

In various embodiments, systems and methods are presented for providing resources by way of a platform as a service in a distributed computing environment to perform a job. Resources of the system, job performing on the system, and schedulers of the jobs performing on the system are decoupled in a manner that allows a job to easily migrate among resources. It is contemplated that the migration of jobs from a first pool of resource to a second pool of resource is performed by the system without human intervention. The migration of a job may utilize different schedulers for the different resources. Further, it is contemplated that a pool of resources may automatically allocate additional or fewer resources in response to a migration of a job.

A first exemplary aspect includes a computer-implemented method for providing resources in a distributed computing environment. The method is comprised of receiving a work item from the user associated with a task account. Further, the method is comprised of creating a job from the work item. Additionally, it is contemplated that the method is comprised of automatically, with a processor and memory, allocating at least a first virtual machine to a first pool. The method is further contemplated as being comprised of assigning the job on the first pool and scheduling tasks for the job on the first pool. Further, it is contemplated that the method is comprised of reassigning the job to a second pool, which is comprised of at least a second virtual machine. Additionally, the method is comprised of scheduling tasks for the job on the second pool.

A second exemplary aspect provided herein includes computer-storage media storing computer-useable instructions that, when executed by a computing device having a processor and memory, perform a method for providing resources in a distributed computing environment. The method is comprised of scheduling, with a first scheduler, a job on a first pool of resource in the distributed computing environment. The method is further comprised of assigning the job to the first pool. Additionally, the method is comprised of determining, without a user intervention, the job is to migrate from the first pool to a second pool within the distributed computing environment. Additionally, the method is comprised of assigning the job on the second pool. The method is further comprised of automatically scheduling, with a second scheduler using a processor and memory, the job on the second pool.

A third exemplary aspect of the present invention presented herein includes a computer-implemented method for providing resources in a distributed computing environment. The method is comprised of receiving, at a task location service, a work item from a user associated with a task account in the distributed computing environment. The method is further comprised of automatically allocating, with a pool server associated with the task location service, a set of first virtual machines of the distributed computing environment to a first pool. The method is additionally comprised of scheduling a first job on the first pool, wherein the first job is comprised of one or more tasks associated with the work item. Further, the method is comprised of automatically determining, based on a load balancing evaluation of the first pool, the job is to migrate to a second pool within the distributed computing environment. Additionally, the method is comprised of migrating at least one task associated with the work item/job to the second pool. The method also is comprised of scheduling the at least one task on one or more resource of the second pool.

Overview

Due to increases in the speed of data transmission over networks and improvements in other network features, it is increasingly possible to perform large-scale computing tasks in an environment where computing resources are distributed over a large network. A user in a first location can submit a job or computing task to a computing service and have the task performed on a group of computers to which the user has no direct knowledge. The computing resources for performing the user's task may be distributed over multiple physical locations, which may span different states, countries, and/or continents. A first group of computing resources located in one or more locations can store the data and other information for performing the user's computing task, while a second group of computing resources, in the same locations or possibly in a different set of one or more locations, can be used to perform the computing task. Further, it is contemplated that the one or more locations for storing the data may be dispersed across different geographical regions, with or without knowledge by the user. Similarly, it is contemplated that the computing resources may be dispersed across different geographic locations with or without the user's knowledge.

Access to a variety of distributed computing resources allows a user to perform job tasks (e.g., running processes) without concern for where the computing resources are located. The distributed resources also provide an opportunity for a user to scale out (or scale in) the amount of resources used in order to meet goals for a computing task, such as completing the computing task by a specified time or with a desired cost value. However, providing this flexibility for the user poses a number of challenges for the operator (and/or owner) of the distributed computing resources. In order to meet demand, the operator of a distributed network of resources will preferably have sufficient available resources to satisfy resource requests at times of peak demand.

Exemplary Computing Environment

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes non-transitory computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Definitions

An "account" is a global uniquely identified entity within the distributed computing environment. In an embodiment, all of the resources and tasks discussed below are scoped within an account. Typically, a user will create an account first before using the resources of a distributed computing system. After creating the account, the user can use the account to submit work items to the system and manage resources for performing jobs based on the work items.

A "work item" is a static representation of a job to be run in the distributed computing environment. A work item can specify various aspects of a job, including job binaries, pointers to the data to be processed, and optionally the command line to launch tasks for performing the job. In addition, a work item may specify the reoccurrence schedule, priority and constraints. For example, a work item can specify to be launched every day at 5 PM.

A "job" is a running instance of a work item. A job contains a collection of tasks that work together to perform a distributed computation. The tasks can run on one or more virtual machines in the distributed computing environment. A job is discussed in more detail with respect to FIG. 2 hereinafter.

A "task" is the fundamental execution unit of a job. Each task runs on a virtual machine. Users can specify additional input to the command line and pointers to input data for each task. A task may create a hierarchy of files under its working directory on the virtual machine performing the task during the course of execution of the task.

A "job manager task" (also referred to herein as a "JM task") is a special task in a job. A job manager task is optional, so some jobs may be performed without the use of a JM task. A job manager task may provide a single control point for all of the tasks within a job and can be used as the "master" task for the job. If a job has a JM task, the system launches the JM task as the first task in the job. The JM task can then submit more tasks to the job, and it can monitor the progress of these tasks and control when to submit the next batch of tasks. However, it is also contemplated that tasks may also be submitted by one or more services outside of the system to the job even when a JM task is associated with the job. In this way, the JM task can coordinate the scheduling of the tasks in a job and manage dependencies among tasks. If the node or virtual machine for the job manager task fails, the JM task can be restarted on another virtual machine so that the JM task is always running for the corresponding job. In an exemplary aspect, the JM task is automatically restarted on another virtual machine. In addition, users can specify to the system that once the JM task completes, the system can terminate all the tasks in the corresponding job. An exemplary JM task (or also referred to as a job task manager) is discussed hereinafter with respect to FIG. 2.

Job

Figure 2:
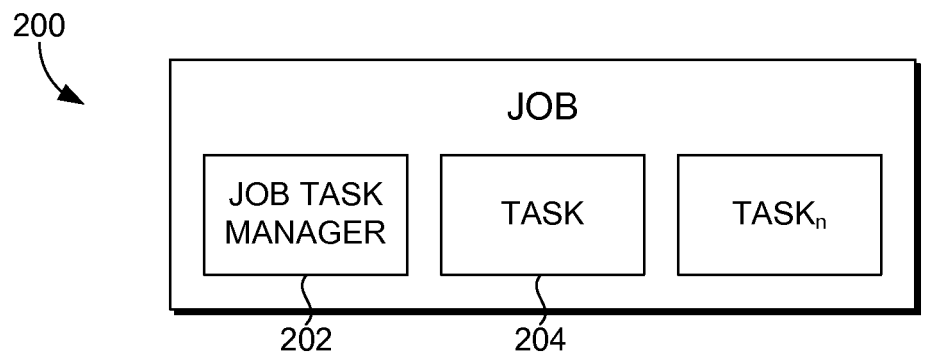
FIG. 2 depicts a block diagram illustrating an exemplary job, in accordance with aspects of the present invention.

A job, as defined above, is a running instance of a work item. FIG. 2 depicts a block diagram of an exemplary job 200, in accordance with aspects of the present invention. The job 200 is comprised of a plurality of tasks, such as a task 204. As also defined above, a task is a fundamental execution unit of the job that is executed by a virtual machine within a task tenant (also referred to as a task machine herein and discussed below). In addition to a plurality of tasks, the job 200 may optionally be comprised of a job task manager 202 (also referred to as a JM task herein). The job task manager 202 may provide a single control point for all of the other tasks (e.g., task 204) within the job 200.

As will be discussed in greater detail herein, a work item is a static representation of a job. The work item is referred to as a job, in an exemplary embodiment, once the resource of the distributed computing system initiate computational resources (e.g., loading the job, queuing the job, instantiating tasks within the job). Stated differently, in an exemplary aspect, a work item becomes a job once the system begins processing the work item.

Virtual Machine Pools

A virtual machine refers to a logical unit of processing capability. A virtual machine can have a one to one correspondence with a physical processor, or a virtual machine can correspond to a plurality of processors, or a virtual machine can represent a percentage of processing time/cycles on one or more processors. Regardless, it is contemplated that a virtual machine, in an exemplary aspect, may be described, at least in part, by the computing device 100 of FIG. 1.

Figure 3:
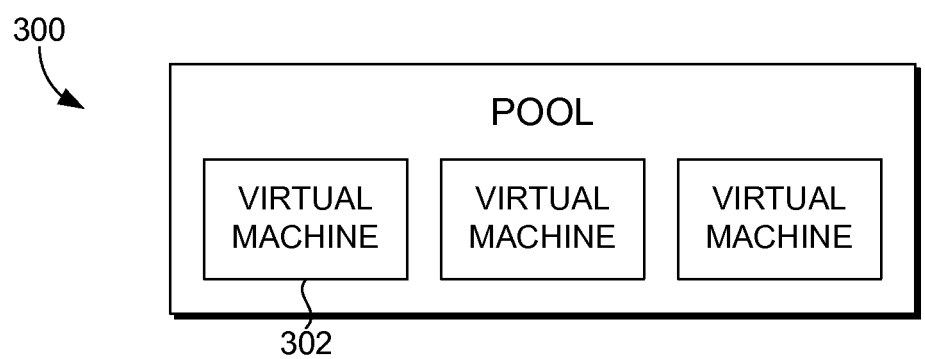
FIG. 3 depicts a block diagram illustrating an exemplary pool, in accordance with aspects of the present invention.

In various embodiments, the virtual machines, which may perform a job based on a work item, are associated with the account for the work item prior to use. A "pool" is a logical grouping of virtual machines. FIG. 3 depicts a block diagram of a pool 300 comprised of a plurality of virtual machines, such as a virtual machine 302, in accordance with aspects of the present invention. It is contemplated that a pool may have allocated virtual machines spanning different data center, different geographic location, and different physical configurations.

In an exemplary aspect, a work item always has at least one associated pool to run the job(s) corresponding to the work item. Each account (e.g., task account) can create one or more pools to which the account gets exclusive access for use in performing work items associated with the account. A pool can be created when a work item is submitted by a user, or a work item can be associated with an existing pool. Optionally, a pool can be associated for use with a single work item or another subset of the work items corresponding to an account. Further yet, it is contemplated that a pool may be automatically created by the system for a job. For example, a reoccurring work item may run every day at a particular time and usually require two hours to complete. In this example, a pool may be automatically created every day when the job is created and the pool may be deleted when the job completes.

When a work item is submitted by a user, the work item can be associated with one or more pools of virtual machines, in an exemplary aspect. Further, it is contemplated that the work item may be exclusively associated with a single pool (further it is contemplated that multiple work items/job may be associated with a common pool). The virtual machines can be organized within a pool in any convenient manner. For example, all virtual machines may be organized in a single pool regardless of the geographic location of the underlying processor for the virtual machine. Another option is to organize virtual machines based on geographic location, so that all virtual machines for a pool are in a given geographic location. Still another option is to organize virtual machines on a basis other than geographic location, such as proximity to other variables (e.g., storage resource, network latencies, user location/preference, and security requirements).

Another contemplated process for forming a pool utilizes system resource to automatically generate the pool. The auto pool creation allows a pool to be created automatically by the system when either a work item is created or when a job itself is created. This process abstracts the creation of the pool from the customer/user/client. In this mode operation, the customer/user/client is limited in their responsibilities to the work item or the job to run. In an exemplary aspect, the pool is automatically created when running the job and the pool is automatically torn down when the job has finished. Further, it is contemplated that the pool is automatically created when the work item is created and the pool is automatically torn down when the work item is deleted/finished.

It is contemplated that a virtual machine may run one task and/or many tasks in an exemplary aspect. Further, it is contemplated that multiple jobs may run on the same virtual machine pool. The VM pool may grow and shrink in size automatically without user intervention and without explicit handling from the jobs, in an exemplary aspect. For example, a job may not be responsible for compensating for the expansion or shrinkage of a pool. Similarly, it is contemplated that a job may span multiple pools. This spanning of multiple pools may be achieved by load balancing the job across multiple pools that are able to independently grow and shrink in VM resources. Further yet, it is contemplated that a pool may be comprised of zero virtual machines at a given time. This may occur when there are no tasks for the job to perform. As a result, it is contemplated that a pool may shrink down to zero VMs during a period of time to save computational resources.

Dedicated, Standby, and Preemptible Machines

In an exemplary embodiment, when a virtual machine is assigned to a pool, the virtual machine can be in (at least) one of two types. The virtual machine can be assigned to the pool as a dedicated virtual machine or a preemptible virtual machine. The status of a virtual machine as dedicated or preemptible can also change while the virtual machine is in the pool.

A "dedicated" virtual machine is a machine assigned to a pool for dedicated use by work items/jobs assigned to the pool. Optionally, a dedicated virtual machine may be assigned for dedicated use for one or more associated work items, as opposed to being generally available for any job submitted to the pool. While a virtual machine has a dedicated status, the machine is reserved for use by work items/jobs associated with the pool.

A "preemptible" virtual machine is a virtual machine that is currently performing a job in a pool on behalf of an account, but without a guarantee that the virtual machine will continue to be available for that pool. When a preemptible virtual machine is made available to a pool, the preemptible machine is added to that pool, which may then be used by work items/jobs. The preemptible machine is then provisioned and used to perform a job for that pool. The preemptible machine can be made available to the pool by any convenient method, such as by having the pool, on behalf of an account, win processing time on the preemptible virtual machine in a resource auction.

A virtual machine made available for use to an account will typically be a virtual machine that has another purpose in the distributed computing environment. For example, one source of preemptible virtual machines is virtual machines provisioned by the distributed computing environment owner/operator for disaster recovery purposes. In order to provide stable operation, a distributed computing environment may include one or more groups virtual machines that are held in reserve. These reserve virtual machines are available to replace resources that are lost due to a processor failure, network failure, or any other kind of event that results in a portion of the distributed environment being no longer suitable for performing jobs. When one or more dedicated virtual machines assigned to a pool are lost due to an event, the lost machines can be replaced using the reserve virtual machines. This improves the availability of resources in the distributed computing environment. However, since it is desirable for failure events to be rare, having a reserve of disaster recovery machines will often mean that a large number of virtual machines are idle and waiting to be used. Rather than wasting the CPU cycles of these virtual machines designated for handling failure events, the CPU cycles of these virtual machines can be assigned to pools as preemptible VMs to run work items/jobs. If a failure occurs and the system needs to take preemptible resources away to fill requirements of dedicated resources, a preemptible job running on such a virtual machine will be stopped as soon as is feasible (and possibly immediately) so that the preemptible virtual machine can be used for its original purpose of replacing a lost or failed resource.

Another source of preemptible machines is excess capacity virtual machines. Typically, the peak load of any network will be different from the average load. As a result, a computing environment with sufficient resources to handle a peak load situation will often have excess resources available during other times. These excess resources provide a resource cushion. When a user makes a request for additional dedicated virtual machines, the excess virtual machines can be used to fulfill the user's request. When the distributed computing environment has a load that is less than the peak load for dedicated machines, one or more virtual machines will be free. Rather than wasting the CPU cycles of these virtual machines designated for providing spare capacity, the CPU cycles of these virtual machines can be assigned to users and pools on a preemptible basis. As the load of requests for dedicated virtual machines increases, preemptible jobs running on these excess virtual machines will be stopped as soon as is feasible (and possibly immediately). This allows the preemptible virtual machine to be used for its original purpose of providing additional dedicated resources when needed. Additionally or alternately, some increases in the load for dedicated machines will be due to scheduled requests for dedicated machines. If a virtual machine is going to become unavailable due to use as a dedicated machine at a scheduled time, a preemptible job assigned to the virtual machine may be stopped prior to the scheduled time to allow for an orderly transition from the preemptible job to the dedicated resources.

Still another source of virtual machines is virtual machines associated with a pool or an account in a "standby" reservation. A "standby" virtual machine reservation is a virtual machine reservation that is associated with a first account or pool and provisioned for use by that first account or pool. Further it is contemplated that a standby virtual machine reservation is not tagged to a specific pool, instead the system maintains a defined number of VMs that are kept for standby by an account or pool. When the standby VMs are needed, the reservation number of standby VMs may be reduced to satisfy a required number of VMs. In an exemplary aspect, the total number of VMs in a system may equal dedicated VMs+ reserved standby VMs+VMs free for computing that are not assigned elsewhere+VMs kept in reserve for disasters and over provisioning. In this example, it is contemplated that the number of preemptible VMs being used in system is less than or equal to the number of reserved standby VMs+VMs free for computing.

Provisioning the standby machine reservation can include reserving VM capacity somewhere in the system (e.g., pool level, account level). A standby virtual machine reservation is not an allocation of a virtual. Instead, a standby virtual machine reservation reserves the right in the future to take an idle or preemptible VM and change it to a dedicated VM for that pool or account use. A standby VM, which is a count, may be associated with two different pools.

One use for standby machines is for users that have high priority computation jobs that occur only during a specific time frame. For example, a financial company may wish to perform analysis of the daily activity of one or more financial markets, such as a stock exchange or a commodities exchange. Continuing with this example, the financial markets may open and close on a defined schedule, such as opening at 9:30 AM and closing at 4:00 PM. The financial company would like to aggregate data from the hours the financial markets are open for use in performing analysis or simulations. The goal of the analysis is to provide information for their employees before the markets open the following day. Such analysis can require a large number of virtual machines, but the virtual machines are needed only between the hours of, for example, from 6:00 PM until 3:30 AM the following morning. During this time the financial company desires a guarantee of availability of the virtual machines. During the rest of the day, the financial company does not need the machines. Assigning a standby virtual machine reservation to the account of the financial company can achieve this goal. In exchange for paying a reservation price, the financial company is guaranteed the availability of the machines during the desired times. Outside of the desired time window, the virtual machines can be used as preemptible machines for the financial company and/or other users. When executing a standby reservation that needs to take preemptible VMs to fulfill the reservation, preemptible jobs can be stopped in an orderly manner prior to the scheduled availability event.

When a standby VM reservation is converted to dedicated machines, this is defined as conversion based on time-based criteria. In other words, the standby VM reservation is converted to dedicated machines based at least in part on a predetermined time and/or date. Time-based criteria are in contrast to activity criteria which are used to define an activity threshold. An activity threshold corresponds to a threshold based on usage and/or performance of one or more distributed resources. For example, in an account, a customer may pay to reserve a number of standby VMs and that standby VM reservation may be used for either time-based criteria or dynamic threshold auto-scaling criteria. Further, it is contemplated that a standby VM reservation may be converted at any point, regardless of reservation time or other scheduling reservation policies. For example, a user (or administrator) may provide a request that one or more standby VMs from the reservation are to be converted.

Another use for a standby VM reservation is to allow for improved performance when scaling out a job. For example, a retail store may use distributed computing resources to handle additional on-line traffic during the shopping season in advance of a holiday, such as on-line traffic for reviewing the retailer's website and placing orders. Based on past experience, the retailer expects a certain level of on-line activity, and reserves a corresponding number of dedicated virtual machines. However, in the event that on-line activity is greater than expected, the retailer also reserves additional machines in standby mode. The retailer can then set up one or more thresholds that indicate a higher than expected level of activity. As these thresholds occur, the standby VM reservations can be used to convert idle or preemptible machines to allow the retailer to handle the additional on-line traffic without having the customers of the retailer experience slow response times. In this situation, a standby VM reservation may be converted to a dedicated machine at an unpredictable time, as it may not be known when an activity threshold will be satisfied. When an activity threshold is met, idle VMs are used or preemptible tasks are stopped and the machine is converted to a dedicated machine.

Figure 4:
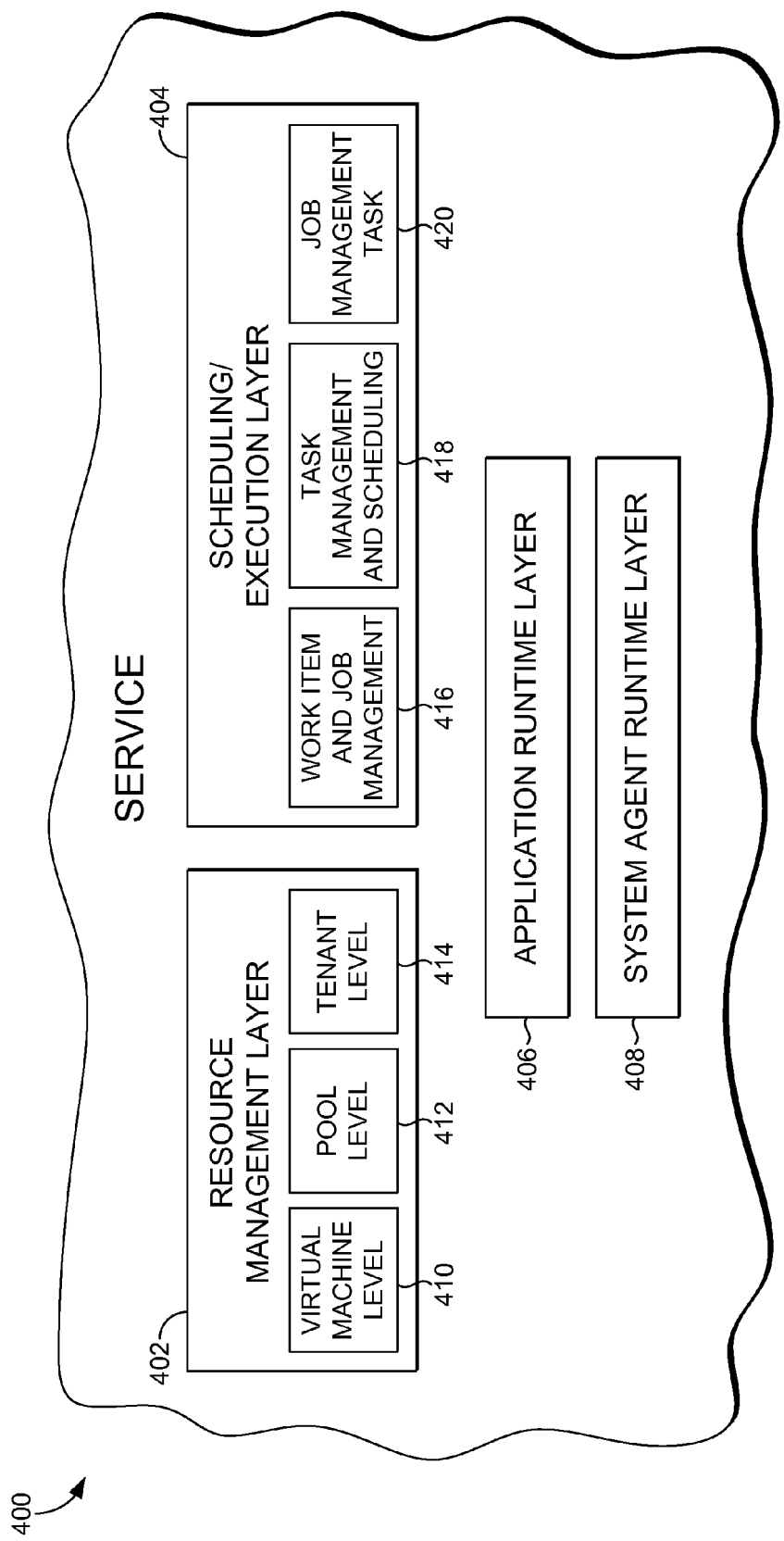
FIG. 4 depicts a block diagram illustrating architectural layers of an exemplary system suitable for performing tasks within a distributed computing environment, in accordance with aspects of the present invention.

Example of Organization of Computing Resources in a Distributed Network Environment A user of a distributed computing environment will typically desire to perform jobs using the distributed computing resources (e.g., cloud computing resources). The jobs may typically involve performing jobs on data that is stored in locations that are accessible via the distributed computing environment, such as by way of a network (e.g., the Internet). One way for an operator to provide a distributed computing environment is to provide the environment as a number of layers. FIG. 4 depicts a block diagram forming layers of an exemplary system suitable for performing tasks within a distributed computing environment, in accordance with aspects of the present invention. The system in FIG. 4 includes a system agent runtime layer 408 (may also be referred to as a task runtime layer) system agent runtime layer 408, an application runtime layer 406 (may also be referred to as a third party task runtime layer), a resource management layer 402, and a scheduling and execution layer 404.

In the embodiment shown in FIG. 4, the system agent runtime layer 408 is responsible for setting up the execution environment and security context for a pool and the work item/job/task to be run in the execution environment. The system agent runtime layer 408 can also launch tasks and monitor the status of the tasks. The system agent runtime layer 408 can take the form of a system agent running on each virtual machine. The task runtime layer may also include a runtime library that can be linked into a user's task executables. Having runtime libraries as part of the system agent runtime layer 408 can potentially provide richer capability to tasks executed by the system agent. Examples of runtime libraries include one or more efficient communication libraries to allow fast communication among tasks; an efficient remote file access library support to read files from other virtual machines and/or other tasks; a checkpoint library to allow tasks to checkpoint (e.g. into binary large objects) and resume; a logging library; and a library for providing a distributed file system to be used across virtual machines performing a given task within a pool of virtual machines.

The application runtime layer 406 allows additional runtimes to be built and run on top of system agent runtime layer 408. The application runtime layer 406 also can provide additional capabilities for coordinating the running of tasks for a job. Examples may include a Map Reduce runtime to a library for providing a distributed file system to be used across VMs performing a given task within a pool of VMs. This allows a user to organize the distributed computing environment in a manner tailored for the user's jobs or tasks.

Resource management layer 402 deals with managing the computing resources available in the distributed computing environment. One option is to have the resource management layer 402 manage the resources at three different levels. At a first level, the resource management layer 402 manages the allocation and de-allocation of virtual machines associated with a job (i.e., execution of a work item) as well as the files stored on each virtual machine associated with a task, which is depicted by a virtual machine level 410.

At a second level, the virtual machines associated with a job can be grouped into pools of machines, which are depicted at a pool level 412. A pool can contain virtual machines associated with one or more jobs and/or work items. Depending on the embodiment, a single pool can span across multiple clusters, such as all clusters in a data center or a plurality of clusters across a plurality of data centers. A single pool can contain a large number of virtual machines, such as millions. The virtual machines can be contained in a large number of pools, such as up to billions.

At a third level of the resource management layer 402, the resource management layer manages the size of each of the task tenants (to be discussed hereinafter). This allows for the system as a whole to dynamically adjust the amount of compute resources that are utilized based on a number of metrics, such as a current load of the system and a timely release of unused virtual machines back to the system for other allocations. This level is depicted by the tenant level 414.

In the embodiment shown in FIG. 4, scheduling and execution layer 404 manages work items, jobs, and tasks that are being performed by a user. The scheduling and execution layer 404 makes scheduling decisions and is responsible for launching jobs and tasks as well as retries on failures. Such a scheduling and execution layer 404 can include components for managing jobs and/or tasks at various levels.

Exemplary components may include a work item and job management component 416, a task management and scheduling component 418, and a job manager task component 420. The work item and job management component 416 maintains all the work items that one or more users (or all users) have created/communicated to the system. Based on a specification of each of the active work items, the system may then create jobs and job queues to which the tasks are submitted. The work item may have a reoccurrence schedule specified (e.g., every day at 5 pm). The system may then create jobs according to the reoccurrence schedule for the work item. The work item and job management component 416 may also be responsible for managing the termination and cleanup of work items and jobs in the system.

The task management and scheduling component 418 allow for a user of the system to submit (e.g., communicate) tasks to a job of the system. This component is responsible for scheduling the tasks across all of the jobs/work items in the system while keeping track of the status of these tasks. The task management and scheduling component 418 may include a set of task schedulers distributed across one/some/all of the task tenants (i.e., task machines) allowing each scheduler to only associate with a limited set of resources (e.g., virtual machines) and tasks. Consequently, the task management and scheduling component 418 allows the system to support billions of active tasks running on virtual machines across a variety of task tenants, in an exemplary aspect.

The job manager task component 420 allows for a JM task, which may optionally be associated with each job, to be launched as an initial task of a job. As previously discussed, a JM task (also referred to as a task job manager) provides a single control point of tasks within a particular job. This allows a JM task to submit additional tasks to a job and to monitor progress of these tasks, which allows the JM task to control when to terminate the job. A JM task may be an example of a mechanism that aids the application runtime layer 406 control and run their systems.

Figure 5:
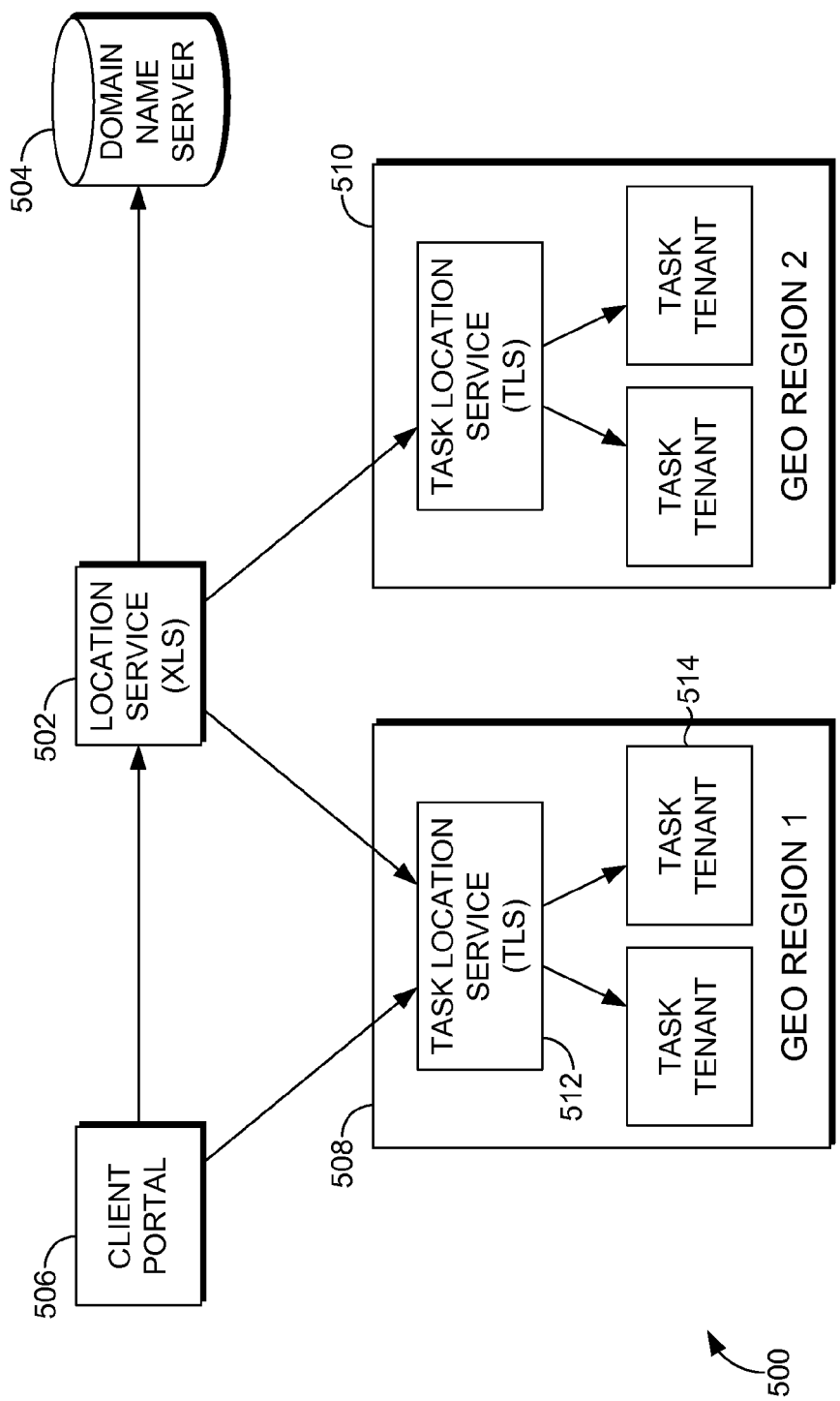
FIG. 5 depicts a block diagram illustrating an exemplary arrangement of processors at different locations that may be integrated within a single distributed computing architecture, in accordance with aspects of the present invention.

The layers described above can be implemented in a distributed computing environment that includes processors at multiple geographic locations. FIG. 5 depicts a block diagram illustrating an exemplary arrangement of processors at different locations that may be integrated within a single distributed computing system 500, in accordance with aspects of the present invention.

In FIG. 5, one or more task tenants 514 can be used to manage pools of virtual machines. A task tenant 514 can maintain a set of virtual machines (as will be discussed in greater detail hereinafter with respect to FIG. 9). The jobs of one or more users can run on the virtual machines within a task tenant 514 as part of one or more pools of virtual machines. One or more task tenants 514 can be used in a given geographic region. The responsibilities of a task tenant 514 can include maintaining the set of virtual machines and dynamically growing or shrink the task tenant based on the resource utilization within the task tenant. This allows a task tenant 514 to increase the number of virtual machines within the task tenant to accommodate increased customer demand. This also allows a task tenant 514 to release unused virtual machines so that the virtual machines can be allocated to other hosted services in the data center handling service for other customers. Another responsibility of a task tenant 514 can be implementing part of the pool allocation/de-allocation/management logic. This allows the task tenant 514 to participate in determining how virtual machines are assigned to pools associated with a task for a customer. The task tenant 514 can also be responsible for scheduling and execution of tasks on the virtual machines within the task tenant.

In the embodiment shown in FIG. 5, one or more task location services 512 ("TLS") (as will be discussed in greater detail hereinafter with respect to FIGS. 6-8) is provided that controls all of the task tenants 514 in a given geographic region and/or across a variety of geographical regions. In FIG. 5, task location services 512 are shown that serve regions labeled "Geo Region 1" and "Geo Region 2." The responsibilities of a task location service 512 can include management of task accounts for the given geographic region. The task location services 512 can also provide application programming interfaces (APIs) for allowing users to interact with the distributed computing environment. Such APIs can include handling APIs associated with pools of virtual machines, pool management logic, and coordination of pool management logic across task tenants within a given geographic region. The APIs can also include APIs for handling tasks submitted by a user, as well as maintaining, scheduling, and terminating work items or jobs associated with the user tasks. The APIs can further include APIs for statistics collection, aggregation, and reporting for all work items, jobs, tasks, and pools in a geographic region. Additionally, the APIs can include APIs for allowing auction of available virtual machines as preemptible VMs to users on a short term basis based on a spot market for virtual machines. The APIs can also include APIs for metering usage and providing billing support.

The task location services 512 can be linked together by a global location service 502 ("XLS"). The global location service 502 can be responsible for account creation and management of accounts, including managing task accounts in conjunction with the task location service 512. For example, the global location service may be responsible for disaster recovery and availability of work items and jobs in the event of a data center disaster. This may include running a work item or job in a different location due to the data center not being available and allowing customers to migrate their work items, jobs, and pools from one data center to another data center. Typically there will be only one active global location service 502 in the system 500 at any given time. This active global location service 502 is in communication with the various task location services 512 as well as service components for managing data storage (not shown). The global location service can maintain a global account namespace, such as at a domain name server 504.

As an example of operation of the system in FIG. 5, a hypothetical customer or user may access the system 500 using a client portal 506 to create a task account via an interface provided by the global location service 502. In this example, the hypothetical customer is referred to as Sally. The user request to create a task account may optionally specify a geographic region that the account needs to be created in. In this example, Sally requests an account associated with the Geo Region 1, which has a failover region of Geo Region 2. In response, the global location service 502 contacts the task location service 512 that corresponds to the requested geographic region (e.g., Geo Region 1) to create the account. If a region is not requested, the task account can be created in a region selected by any convenient method, such as based on a location associated with the requesting user or available resources. The task location service 512 maintains all the information for all the accounts in its geographic region. After successfully creating the account in the task location service 512 for Geo Region 1 and potentially a disaster recovery copy in the Geo Region 2, the global location service 502 registers the task service endpoint for Sally's account to point to a virtual IP address of the task location service 512 for Geo Region 1. For example, a domain name service (DNS) record can be created to map a host name such as "sally.task.core.servicecompany.net" to the virtual IP address of the task location service 512 in Geo Region 1. This completes the creation of the task account for Sally, in this exemplary aspect. Further, it is contemplated that in the event of a failure in the Geo Region 1, the global location service may update the DNS record to point to the Geo Region 2.

After the account is created, the customer Sally can access the task account and send requests to access the APIs for interacting with the distributed computing environment against the hostname "sally.task.core.servicecompany.net." For example, Sally can access an API to issue a request to create a new work item or task. A DNS server can then resolve the hostname and the request will be routed to the correct task location service 512. In this example, the request is routed to the task location service 512 for Geo Region 1, which processes the request and creates the requested work item, job, or task.

It is contemplated that any number of client portals 506, geo regions 508, 510, task location services 512, and/or task tenants 514 may be implemented in any combination in exemplary aspects of the present invention. For example, it is contemplated that a task location service 512 may be associated with tens, hundreds, or thousands of task tenants, in an exemplary aspect.

Figure 6:
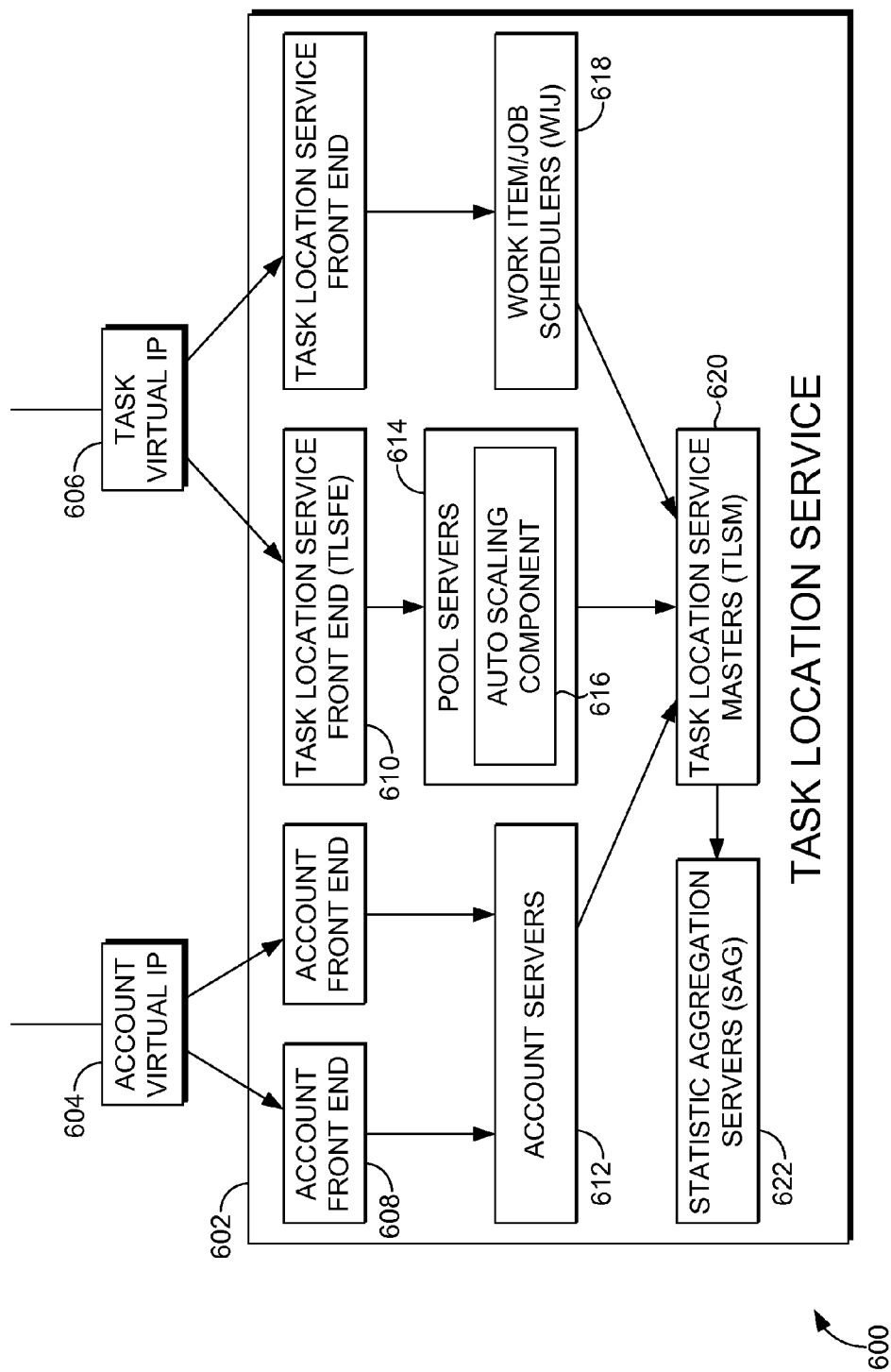
FIG. 6 depicts a block diagram illustrating a potential configuration for a task location service, in accordance with aspects of the present invention.

FIG. 6 depicts a block diagram illustrating a potential configuration for a task location service 602, in accordance with aspects of the present invention. In the configuration shown in FIG. 6, a task location service can include one or more account servers 612. The account servers handle account management for accounts in a given geographic region, including creation, deletion, or property updates. Account front ends 608 serve as the front end nodes for account service. The account front ends 608 are behind an account virtual IP address 604 as shown in the figure. The account front ends 608 process the account API requests coming from global location service, such as API requests to create accounts or delete accounts.

The configuration in FIG. 6 also includes one or more pool servers 614. A pool server 614 handles pool management and pool transactions for pools of virtual machines in a given geographic region. A pool server 614 handles pool creation, deletion and property updates. A pool server 614 also manages the high level virtual machine allocation algorithm across multiple task tenants. Virtual machine allocation can take into consideration the connectivity of a virtual machine with storage for a given user. The pool server may also perform other tasks related to allocation of virtual machines.

Further, it is contemplated that the pool server 614 may further be comprised of an auto-scaling component 616. The auto-scaling component 616 may be formed as a module that is responsible for running user provided auto scaling rules (e.g., formulas) that automatically determine a desired number of dedicated, standby, and/or preemptible virtual machines for a pool. Stated differently, the auto-scaling component may be responsible for making auto-scaling decision based on auto-scaling rules associated with a given pool. The auto-scaling component 616 may receive metrics regarding the pool or jobs assigned to the pool and apply those with the user-provided (or system provided) rules to compute an auto-scaling action on the pool. An auto-scaling action may include increasing or decreasing a number of dedicated virtual machines; increasing or decreasing a number of standby virtual machines in reservation, increasing or decreasing a target number of preemptible virtual machines for the pool while also updating the bid price for those resources.

The configuration in FIG. 6 also includes one or more work item or job schedulers ("WIJ") 618 (as will be discussed in greater detail hereinafter with respect to FIG. 8). WIJ schedulers 618 handle creation, deletion, and updates of work items and jobs. The WIJ is also responsible for the creating of jobs based on a schedule specified in the related work item as well as adding the JM task (if one is to be added) to the job, in an exemplary embodiment. In addition, the WIJ schedulers 618 may initiate the creation and deletion of pools associated with the work items when an auto-pool configuration is desired (as opposed to a traditional manual creation by a user). The WIJ schedulers 618 may also use generic partitioning mechanisms for scaling within a task location service. In an embodiment, there are multiple WIJ schedulers 618 in each task location service, and each of the WIJ schedulers handles a range of work items.

The pool servers 614 and WIJ schedulers 618 receive requests from users via task location service front ends 610 (as will be discussed in greater detail hereinafter at FIG. 7). The task location service front ends 610 are also responsible for calling corresponding components to process requests from users. The task location service front ends 610 are behind an account virtual IP address 606 as shown in the figure.

The configuration in FIG. 6 further includes a task location service master 620. In an embodiment, the task location service master 620 has two main responsibilities. First, the task location service master 620 serves as a master system for implementing partitioning logic for the corresponding servers in a task location service 602. Additionally, the task location service master 620 can be responsible for computing the new market price for preemptible virtual machines at the beginning of each spot period for the entire geographic region of the task location service or coordinating the bid requests for preemptible machines with an external service that is responsible for the spot pricing. It collects current bids and resource availability information from the pool servers and task tenants, and computes the new market price accordingly or communicates the information to a spot market service. It also makes high level allocation guidance to pool servers about preemptible virtual machines across all task tenants in a geographic region.

In order to track the activity and behavior of the computing environment, a task location service master 620 can communicate with one or more statistics aggregation servers 622. The statistics aggregation servers are responsible for collecting and aggregating detailed statistics for tasks, jobs, work items and pools. The other components in the system emit fine-grained statistics for tasks and virtual machines. The statistics aggregation servers aggregate these fine-grained statistics from task level or virtual machine level statistics into work item, account level, and/or pool level statistics. The statistics can be exposed for use via an API. In addition, the statistics aggregation servers can be responsible for generating hourly metering records for each account for use in billing.

FIG. 7 depicts a block diagram illustrating an exemplary task location service front end ("TLSFE") 700, in accordance with aspects of the present invention. The TLSFE 700 may be similar to the task location service front end 610 of FIG. 6 discussed hereinabove in an exemplary aspect.

The TLSFE 700 is comprised of a request processor 702, an authentication and authorization module 704, an account manager component 706, and a business logic module 708. It is contemplated that additional or alternative modules and/or components may be included in alternative embodiments.

The request processor 702 is a component responsible for receiving and identifying on the HTTP(S) end point and accepting a user request. The request processor 702 may then queue and forward each request to the authentication and authorization module 704. The authentication and authorization module 704 is responsible for user request authentication and authorization. The TLSFE uses shared-key authentication to authenticate the incoming requests, in an exemplary aspect. Other forms of authentication are contemplated. Further, the authentication and authorization module 704 interacts with the account manager component 706 to get information about user account and key information. The authentication and authorization module 704 may then determine where a user is authorized to request performance of operations (e.g., the account may be temporarily disabled at the time of request).

The account manager component 706 may be used to encapsulate storage/access account information. The account manager component 706 loads account information on demand, in an exemplary aspect, as requests are received, which allows for the caching of information locally (in memory) to speed processing of frequently accessed accounts. When an account property (e.g., disabled state, authentication keys) change, the account table may be updated. An account manager component 706 running in the TLSFE may see that change when a cached copy (if any) expires, which may be a configurable interval.

The business logic module 708 deals with all the business logic related to the request made by the user, once it has passed the authentication and authorization module 704. The business logic module 708 may also interact with other task components within the distributed computing system. Additionally, it is contemplated that the business logic module 708 monitors a JM task completion queue for completed job manager tasks, which then allows for a notification to be communicated to the WIJ scheduler 618 of FIG. 6 when the tasks complete.

FIG. 8 depicts a block diagram illustrating an exemplary work item/job scheduler ("WIJ") 800, in accordance with aspects of the present invention. The WIJ 800 may be an exemplary WIJ scheduler 618 of FIG. 6.

The WIJ 800 is comprised of a request processor 802, a caching module 804, a heartbeat module 806, and a scheduling module 808. The WIJ 800, as previously discussed may be a role responsible for accepting work items submitted by a user account and scheduling jobs at appropriate times within the work item schedule. Consequently, it is contemplated that the WIJ 800 creates jobs for a work item, creates queues for each spawned new job, which are then used to queue up tasks for the job. A task scheduler of a task tenant (discussed hereinafter with respect to FIG. 9) may then pull tasks from the queue and schedule them on virtual machines at the task tenants. Further, it is contemplated that the WIJ is responsible for the life time management of the work item and related jobs, such as marking the work item/job completed and contacting the appropriate task tenants to start a job.

The request processor 802 is a module responsible for processing various work items/jobs related to requests that are received from a TLSFE (such as the task location service front end 610 of FIG. 6). Additionally, it is contemplated that an account server (e.g., the account server 612 of FIG. 6) communicates requests to the WIJ 800 when an account is deleted.

The caching module 804 is an in-memory cache of the partitions, user accounts, active work items, active jobs, tasks tenant lists, and the like that the WIJ is servicing. This module may be responsible for keeping the cache up-to-date for relevant caching policies.

The heartbeat module 806 coordinates with the task location service master (e.g., the TLSM 620 of FIG. 6) to report health and load status of the WIJ. Additionally, it is contemplated that the heartbeat module 806 also receives new partition assignments from the TLSM via the "heart beat" coordination.

The scheduling module 808 is responsible for scheduling new jobs for work items according to the specified schedule of that work item. It is also responsible for marking the work item and/or job as completed. Further, the scheduling module 808 may be responsible for creating and deleting pools that have their lifetime tied to the lifetime of a work item or a job.

FIG. 9 depicts a block diagram illustrating a task tenant 900 in accordance with aspects of the present invention. The task tenant, in an exemplary aspect, is contemplated as being implemented in the system 500 of FIG. 5 as the task tenant 514. As noted above, a task tenant can assist with managing pools of virtual machines. In the embodiment shown in FIG. 9, a task tenant includes one or more task tenant front ends 904. The task tenant front ends 904 are behind the task tenant virtual IP address which is internally used for communication between a task tenant and its corresponding task location service, including passing through requests between a task location service and a task tenant.

In the embodiment shown in FIG. 9, the task tenant also includes a task scheduler 902. A task scheduler 902 can be responsible for making local task scheduling decisions within a task tenant. The task scheduler 902 decides what task is to run on each virtual machine it controls. For example, a work item or job submitted by a user can have a set of queues which contain the list of tasks to be scheduled. The task scheduler 902 takes tasks from the set of queues, selects one or more available virtual machines in the pool associated with the job, and contacts the virtual machine(s) to schedule these tasks. The task scheduler 902 can also make scheduling decisions based on priority values associated with jobs. Additionally, the task scheduler 902 keeps track of the virtual machines inside a task tenant.

The task scheduler 902 works with pool servers to allocate/deallocate virtual machines to/from pools. In addition, the task scheduler 902 maintains heartbeats with all the virtual machines, synchronizes with the virtual machine about pool membership via heartbeats, and controls restarts/reimage of the virtual machines. Still another function of a task scheduler 902 can be to keep track of the size of the task tenant. Based on the current utilization of the virtual machines within a task tenant, the task scheduler can grow or shrink the task tenant, so that the task tenant has sufficient number of virtual machines to run the tasks associated with the task tenant. Similarly, if there are too many virtual machines sitting idle in the task tenant, the machines can be released for use by other hosted services in the data center.

The task scheduler 902 is comprised of the following components and modules to achieve the above-referenced functionality. For example, the task scheduler may be comprised of a request processor 910, a heartbeat manager 912, a statistics aggregation manager 914, a scheduling loop module 916, a pool allocation manager 918, and a task tenant manager 920.

The task scheduler 902, in an exemplary aspect, "owns" the virtual machines of the task tenant 900 and also "owns" what is performed on those virtual machines. As a result, it is contemplated that a pool of VMs is comprised of VMs across multiple task tenants. When a job is assigned to a pool, the task scheduler 902 can take work items from a queue and run those work items on the virtual machines that the task scheduler 902 "owns" (e.g., the TVM 908 of the task tenant 900). Other task schedulers associated with other task tenants with TVMs in the pool may also take work items from the queue and run those work items on virtual machines associated with each of the unique task schedulers of each task tenant.

The request processor 910 is responsible for processing various requests received from a WIJ, a Pool server, and/or a TLSM. The requests may be routed to the task scheduler from the task tenant front end. Consequently, the request processor 910 may queue up requests for correct subcomponents to consume.

The heartbeat manager 912 is responsible for heartbeating with other virtual machines (e.g., TVM 908) in the task tenant. In response to heart beat communications, this module collects information about the virtual machine health and task health. Additionally, in response to received heartbeats messages, this module may determine which of the virtual machines are idle and can be used for scheduling new tasks. Additionally, the heartbeat monitor may collect various statistics (e.g., CPU, memory, disk usage) about virtual machines. These statistics may then be passed to the statistics aggregation manager 914.

The statistics aggregation manager 914 is responsible for aggregating and organizing by pool, the various statistics that are collected from various virtual machines of the task tenant. The aggregated statistics may then be communicated to a pool server for use in auto scaling operations.

The scheduling loop module 916 may be responsible for scheduling job tasks on the pool virtual machines. The pool allocation manager 918 is responsible with operations related to a pool, such as scaling resources, allocating resource, assigning jobs/work items, and the like, as discussed herein.

The task tenant manager 920 is a module that takes care of growth and contraction of the task tenant itself. This module interacts with the distributed computing system fabric to expand/contract the number of task tenant virtual machines according to a load on the system. Additionally, it is contemplated that the task tenant manager 920 may be responsible for maintaining a buffer of free reimaged virtual machines for quick conversion to dedicated virtual machines for any given pool.

FIG. 9 also shows a plurality of virtual machines associated with a task tenant. In the embodiment shown in FIG. 9, each of the virtual machines includes task virtual machine 908 (TVM). In an embodiment, the task virtual machine 908 is responsible for launching tasks on the virtual machine, as well as setting up directories structures and permissions for the tasks. It also configures the operating system firewall on the virtual machine to only allow traffic between virtual machines within the same pool (if the pool needs intra-communication). As discussed earlier, the task scheduler 902 maintains heartbeats with the virtual machines via the task virtual machines 908. This allows the task scheduler 902 to monitor the health of the virtual machines as well as synchronizing the pool membership information for the task virtual machine agents.

An exemplary task virtual machine 906 is depicted as being comprised of a number of components not depicted in the TVM 908 for brevity sake. However, it is contemplated that any modules/component may be associated with any virtual machine. The components/modules of the task virtual machine 906 comprise a request processor 922, a resource manager 924, a task manager 926, and a security manager 928.

The request processor 922 is responsible for handling various requests that the virtual machine gets from a task scheduler or the task tenant front end. The resource manager 924 is responsible for managing disk quotas, creating directory structure for the system and for downloading resources for a startup task and a job task. The task manager 926 manages the task life time, which starts from the time the virtual machine receives a start task command from the task scheduler and is valid until the system data (e.g., related directory structure) is cleaned up from the virtual machine. The security manager 928 is responsible for setting up the various firewall rules and creating an account with correct privileges for running the user task.

FIG. 10 depicts a block diagram illustrating an exemplary pool server 1000, in accordance with aspects of the present invention. The pool server 1000 may be implemented as the pool server 614 of FIG. 6 discussed hereinabove in an exemplary aspect.

The pool server 1000 is comprised of the following components. A request processor module 1002 that is responsible for accepting incoming operations (e.g., create pool, delete pool, and update pool). A task tenant virtual machine allocation manager module 1004 that performs virtual machine breakdown across task tenants for reserving virtual machines in a pool. It is a decision module that decides which task tenants to choose and how many virtual machines to reserve in a task tenant for a pool. A transaction processor module 1006 may also be associated with a pool server. The transaction processor module is a core module that maintains the lifetime of the pool transaction. This module continues to work on transactions until it successfully finishes or times out or is cancelled. Each transaction is persisted in tables and therefore may be completed across various system components in the event of a failure. An example transaction may include requests from a pool server to a task tenant to allocate, reserve, or deallocate a certain number of VMs in that task tenant for a given pool. Further, it is contemplated that an auto-scaling module 1008 may also be associated with the pool server 1000. As previously discussed with respect to the auto-scaling component 616 of FIG. 6, the auto-scaling module 1008 is responsible for running user provided auto scaling rules (e.g., formulas) that automatically determine a desired number of dedicated, standby, and/or preemptible virtual machines for a pool.

Management of Work Items/Jobs/Tasks

Figure 11:
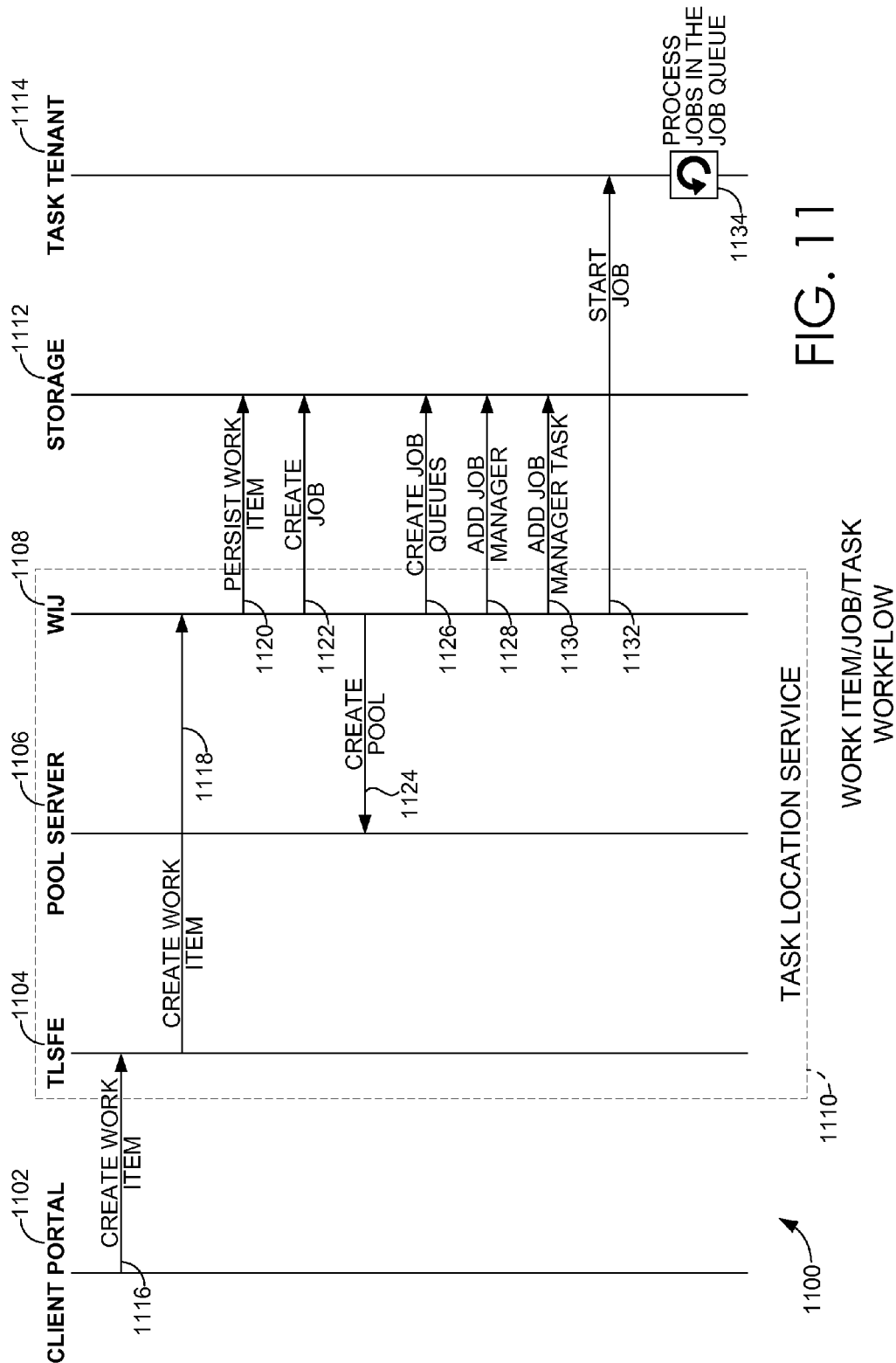
FIG. 11 depicts a communication diagram providing an exemplary work flow between a variety of components in an exemplary distributed computing system, in accordance with aspects of the present invention.

FIG. 11 depicts a communication diagram providing an exemplary work flow 1100 between a variety of components in an exemplary distributed computing system, in accordance with aspects of the present invention. The distributed computing system is comprised of a client portal 1102, a task location service front end (TLSFE) 1104, a pool server 1106 a work item/job scheduler (WIJ) 1108, a storage unit 1112, and a task tenant 1114. All of the components are discussed previously. The TLSFE 1104, pool server 1106, and the WIJ 1108 are associated with a task location service 1110 (such as the TLS 600 of FIG. 6).

The work flow includes a user submitting 1116 a work item through the client portal 1102 to the TLSFE 1104. This submission may be done using an API call to the TLSFE. The TLSFE may then contact 1118 the WIJ 1108 to register the received work item with the system. During the registration of the work item, the pool to use for the work item tasks and option job manager task may be specified. This registration may, in this exemplary aspect, result in a communication from the WIJ 1108 to the storage 1112 for the persisting 1120 of the work item. Further, it is contemplated that the WIJ 1108 will create an associated job that is stored 1122 at the storage 1112.

Because a job should be associated with an auto-pool, the WIJ 1108 may instruct the pool server 1106 to create a pool to which the tasks of the work item will be processed. This work flow is operating under the assumption that a pool does not already exist to which the work item is assigned. In this example, the work item submitted by the user may indicate that it is an auto-pool embodiment. When a work item is received that indicates that an auto-pool setting is included, the pool server 1106 may create 1124 the pool dynamically and automatically. The WIJ may control when the pool will be created/deleted and the WIJ may instruct the pool server accordingly. The pool server may then treat the WIJ requests the same as other user initiated pool creation/deletion requests. Traditionally, the creation of the pool requires a user intervention that prevented the creation of the pool to be dynamic and automatic.

For each job that is spawned by the WIJ 1108, multiple queues may be formed. For example, the WIJ may create 1126 several job queues including a dedicated queue, a preemptible queue, an "any VM" queue, and/or a job manager queue. These various queues are used to hold tasks for the job.

If the work item has an associated job master task, then the WIJ may register the job manager task with the system to have the job manager task as the first task started with the job. Additionally, information may be added to the job manager queue. The system may then ensure that the job manager is always running with the job in the event of a system failure. Those communications are indicated by the WIJ adding 1128 a job manager and adding a job manager task 1130.

Once a WIJ spawns a job, additional tasks for the job may be submitted via an API. The system supports specifying a retry count for each submitted task. If the task fails, the system may re-spawn the task up to a retry count number of times possibly on different virtual machines. If the job has a JM task, then additional tasks for the job may be submitted by the job manager task itself. The system may allow for tasks to be submitted from outside the system after the job has been created.

The TLSFE handles all add task requests and upon receiving an add task request, the TLSFE persists the task information in the task table and also puts metadata about the task in one of the three job queues. The choice of which job queue may depend on where the task was marked to run (e.g., dedicated only, preemptible only, or any VM in the pool).

Once the job is spawned, the WIJ contacts all the task schedulers that have virtual machines for the given pool and informs them about the job start, as seen in the start job communication 1132. Users may specify during a work item creation whether the system should terminate the entire job when the job manager task completes. The system may then maintain this information and, if specified that when the JM tasks completes, the following logic may be implemented. The WIJ may wait for communication about the JM Task completion, which may occur after the task tenant(s) 1114 process jobs in the job queue 1134. When a job manager task is completed, a message is enqueued into the JM completion queue. The JM queue, in an exemplary aspect, is a system queue. The TLSFE may keep monitoring the queue and upon getting a message in the queue, they dequeue the message and inform the appropriate WIJ to handle the job manager completion. After a job manager message is received from the queue, the WIJ may mark the job as completed in its persistent store and removes the message from the JM completion queue.

If a job does not have an associated job manager task or users do not specify to terminate the job with completion of the job manager task, a separate end job request by a customer may be issued to mark the job as completed. Once the job is marked as completed, no additional tasks for the job may be processed. Further, it is contemplated that a job may be marked as recurrent or run once. For recurrent jobs, the WIJ may spawn (e.g., instantiate, create) new jobs at the next recurrent interval. The work item may have a "don not run after" time specified, which would preclude the WIJ from respawning the job after that time. Upon receiving a communication of the start job from the WIJ, a task scheduler starts looking in the job queues for presence of tasks. As additional tasks get queued up, the task scheduler dequeue the tasks and run them on the specified pool virtual machines, in an exemplary aspect.

Task Scheduler Scheduling

A task scheduler ("TS") (such as the task scheduler 902 of FIG. 9) may perform the scheduling of tasks in the following exemplary manner. The TS may maintain most of the scheduling information in memory. However, it is contemplated that information related to tasks that have yet to be picked up from the job queue(s) may not be maintained in memory.

The TS, in an exemplary aspect, performs the scheduling by pool. Therefore, the TS maintains information about each of the pools to which job tasks can be scheduled. This information may be passed to the TS by a WIJ via a start job message (e.g., the start job communication 1132 of FIG. 11). In an exemplary aspect, the TS may persist this information to handle the possibility of a failover scenario. For each pool there may be multiple active jobs. The TS does the scheduling within each pool based on a job priority. However, the priority is at the job level instead of the overarching account level, in an exemplary aspect.

In an exemplary aspect, each TS knows the list of jobs that has been assigned. For each scheduling quantum, the TS picks 'N' items from the various job queues (e.g., there may be multiple job queues per job with different priorities for scheduling different types of tasks such as dedicated and preemptible tasks), wherein each job queue may be a priority queue. In this example, the 'N' items may be equal to a number of VM available in the pool for scheduling tasks. Stated differently, it is contemplated that the TS picks a number of items from the queues that is equal to the number of virtual machines available in the pool.

In addition to other metadata about a task, each queue entry may have a pointer into the main task table, which allows the TS to read information about the task from the task table. The task table may have the task state, which may help a TS determine if the task needs to run. For example, if the task has completed, the task may not need to run again. This may occur when there is a failure after the task completed but the VM could not remove the entry from the job queue. Additionally, it is contemplated that affinity information for the task may be read from the task table. This affinity may allow the TS to determine which of the 'N' items picked from the queues is best suited for a particular virtual machine.

Once a task is assigned to a VM, the TS may populate virtual machine information in the task table corresponding to the task and schedules the task on the virtual machine. Once a virtual machine is assigned a task, the virtual machine may take over extending an invisibility time of the running task in their job queue, which effectively maintains a lease on the task. The VM may update the state of the task to "running" (or a comparable) once it receives the task. Once the resources are downloaded for the task, the VM may update the task state to "running" (or a comparable) and spawns the task process. Consequently, the VM may then delete the corresponding entry for the task from the job queue. If the task happened to be a JM task (job master task), the VM may include a job manager completion entry in the JM completion queue.

Task Retry Handling and Job Manager Task Retry Handling

Generally, a task retry and a JM Task retry handling are performed similarly; however, a few deviations in the processes are present in an exemplary aspect. In an exemplary aspect, each submitted task is associated with a retry count that has been specified with the task. Upon an application failure for execution of a task, the system may reschedule the task a number of times equal to the retry count value before marking the task as completed with an error. In situations of system failure (e.g., a VM fails), the system may automatically retry the failed task without counting towards the retry count.

A virtual machine monitors the task that it spawned. If the task fails, then the VM retries the task on the VM and also updates the retry count in the task table. In an exemplary aspect, the VM retries a task "x" number of times (which is configurable), after that number is exceeded, the VM allows the task scheduler to reschedule the task at an alternative VM by making the task visible again in the queue (e.g., releases the lease on the task). The task scheduler may then pick up the visible item from the queue, updates the retry count, and assigns it to another VM. In this example, the task may only get picked up if there is an available VM. This process may continue until the task completes successfully or the task has been retried a specified number of times.

A JM task may follow a similar process as outlined above. However, it is contemplated that if a VM is not available to spawn the JM task, then the task scheduler may pick up one of the non-JM tasks (e.g., lowest priority at run time) and preempts the task to make resources available for the JM task to run. This may ensure that the JM task is always restarted for a job even in the event of a system failure.

Pool Management

For each task account, one or more pools may be created (or associated). In an exemplary aspect, there are two types of virtual machines in a pool and also a standby VM reservation associated with the pool (as previously discussed). The VMs may be dedicated VMs that are reserved VMs currently being used for the exclusive benefit by the task account or pool. The second VM may be a preemptible VM. A preemptible VM may be any non-dedicated VMs in the system that is available to run preemptible tasks, including VMs reserved as standby VMs or any idle VMs the system has provisioned. The preemptible VMs can be used until the system needs their resources for other purposes.

In an exemplary aspect, an account may specify each number of dedicated VMs and standby reserved VMs in a pool. A standby VM reservation may be converted into a dedicated VM and the opposite is also contemplated. The system may then hold the dedicated and the standby resources for a particular pool.

Various properties may be associated with a pool. Those properties may include a standby VM reservation, a number of dedicated VMs, a type of VM (e.g., small or large), communication requirements (do jobs need cross-task communication), storage account affinity, pool metadata (e.g., metadata set by a user), and/or start task information. The start task information is the task that gets run on each of the pools VMs during an initial setup of the pool and also when a VM reboots. These properties may define, at least in part, a pool and the resource of the pool.

As previously discussed, a job utilizes a pool (and the underlying virtual machines) to run tasks of the job. The tasks run on either dedicated or preemptible VMs in the pool. The standby VM reservation is not used to directly run the tasks, instead the standby VMs are converted to dedicated or preemptible VMs, in an exemplary embodiment. It is contemplated that the pricing for the various VMs may vary. For example, a standby VM reservation may be minimal in costs for reserving the resources, but by reserving, the standby VM reservation is available to be quickly converted into a dedicated or preemptible resource. A dedicated VM may have traditional compute pricing. Preemptible VMs, on the other hand, may be priced by a bidding operation that allows for the concept of spot pricing and other variable pricing constructions.

The creation of a pool may follow a process similar to the following exemplary steps; however, alternative methods are contemplated. A user may initiate the creation of a pool by specifying various parameters, such as a pool name, a VM size, a storage account affinity, cross talk communication requirements, metadata, and the like. The user may send an API request to the TLSFE, which may then forward a related request (or the same request) to a correct pool server. Prior to sending a request to the pool server, the system may authenticate the user. The receiving pool server may then start a pool transaction with a unique identifier. The pool server may then generate a VM reservation breakdown for the task tenants to satisfy the target number of dedicated VMs and the number of VMs to keep reserved as standby. This reservation operation may include persisting the transaction in the event of a system failure so that the pool reservation may ultimately prevail. The pool server may then regularly communicate status (i.e., heartbeats) updates and checks with the task scheduler to keep updated on the reservations. Upon completion of the transaction, the pool server may commit the transaction by informing each task tenant to commit their transaction and then after each task tenant responds, removing the pending transaction.

A pool may be updated by converting the standby VM reservations to dedicated (or vice-versa). This may be accomplished by the system (or the user) providing a desired number of dedicated and standby VMs. The pool server may then handle the updating of the pool by starting new transactions with the associated task tenants and passing new VM targets to those task tenants. At the task tenant, an incoming request may be routed through the TTFE to the task scheduler. If a desired target includes increasing a number of dedicated VMs and reserving extra standby VMs, the task scheduler converts unallocated VMs into dedicated VMs and reduces the standby count. If additional dedicated VMs are still desired, then the task scheduler allocates VMs from the preemptible pool. If insufficient VMs are available, the task tenant may grow to satisfy the request. Stated differently, it is contemplated that free VMs are initially allocated followed by converting preemptible VMs. However, it is also contemplated that preemptible VMs are converted initially and free VMs are allocated to fill any remaining resource needs.

Job Scheduling with a Platform as a Service (PAAS)

Figure 12:
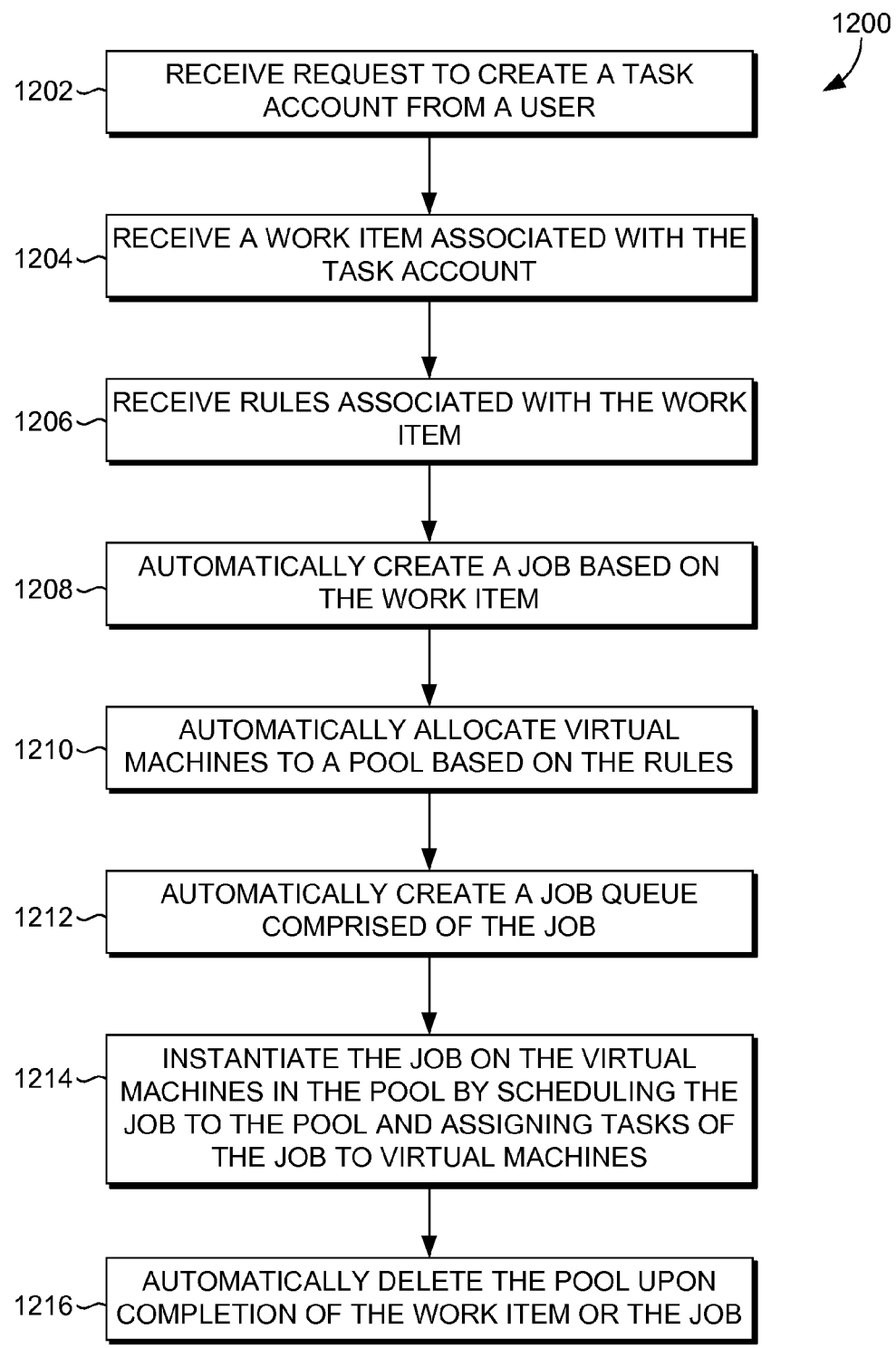
FIG. 12 depicts a block diagram illustrating an exemplary method for providing resources in a distributed computing environment, in accordance with aspects of the present invention.

FIG. 12 depicts a block diagram illustrating an exemplary method 1200 for providing resources in a distributed computing environment, in accordance with aspects of the present invention. At a block 1202, a request is received to create a task account from a user. For example, a user may request, by way of a client portal (including a service management API), that the service generates an account that is useable by the user to perform computations. The request may be received at a high-level location service (e.g., XLS) of the system. While not depicted, it is contemplated that the high-level service ensures the account is created by communicating with lower level task location service in one or more defined clusters of computing resources (e.g., geo regions). Further, it is contemplated, as previously discussed, that the high-level location service coordinates registering the namespace associated with an account or resources used by an account. This registering of the namespace may be carried out utilizing, at least in part, a domain name service.

At a block 1204, a work item associated with the task account is received. For example, a user may submit a work item by way of a client portal. The work item is contemplated as being communicated by the user to a task location service of the system. In an exemplary aspect, the work item is routed to the TLS based, at least in part, on a registered namespace maintained by the system. For example, various communications may be communicated utilizing an account virtual IP address and/or a task virtual IP address, as previous discussed.

Among other components, it is contemplated that the work item may be comprised of binaries to be executed by one or more virtual machines, command line parameters that may be used by a virtual machine, and/or rules. The rules may be useable by the system to automatically create jobs, automatically create pools, automatically run jobs on pools, and/or automatically delete pools, for example. Other functions may be achieved by the rules. At a block 1206, the system received rules associated with the work item. As previously discussed, the rules may be communicated by the user or may be generated, at least in part, by the system based on user-provided information (e.g., preferences associated with the task account). The rules may be a portion of a broader specification defining characteristics of the work item, the resulting job, associated tasks, and/or the pool.

At a block 1208, a job is automatically created based on the work item. As previously discussed, a job may be created by a WIJ of the system. The job is created, in an exemplary aspect based on the rules/specification that was received in connection with the work item. Among other information included with this rules/specification, it is contemplated that priority and other computation altering information may be included that allows the system, without a burden on the user, to automatically create the job for eventual instantiation on a pool (or set of pools).

At a block 1210, when auto-pool is specified in the work item, virtual machines are automatically allocated to a pool for use in processing the job. As previously discussed, the virtual machines allocated to the pool may be based, in part, on the specification and/or rules associated with the work item. For example, the information associated with the work item may specify a desired resource spend, a time in which the work item is desired to be completed, a geographical region in which to compute the tasks, and the like. Utilizing this information a pool server may allocate zero or more virtual machines to the pool. The information used for allocating may be part of a specification that designates a number of dedicated and standby VMs and the like.

At a block 1212, a job queue (or a plurality of job queues as previously discussed) may be automatically created by a WIJ. Further, it is contemplated that a JM task may be created, in an exemplary aspect. Additionally, it is contemplated that the work item may be instantiated as a job on the pool by assigning the job to the pool and then scheduling tasks of the job on the VMs of the pool, as indicated at a block 1214. Therefore, it is contemplated that a work item may be scheduled on a pool as a job. Tasks of the scheduled job may then be assigned to VMs to be run, as part of instantiating a job. As previously discussed, it is contemplated that a task scheduler of a task tenant may be responsible for scheduling one or more tasks in a queue at one or more of the virtual machines within the pool. It is also contemplated that a second job is instantiated on the pool. The second job may be a reoccurring instance of the work item or a job based on a completely different work item.

At a block 1216, it is contemplated that the system automatically deletes, without the intervention or request of the user, the pool. The pool may be deleted in response to the completion of the job or the work item. For example, the pool may be deleted after each job is completed. Additionally, it is contemplated that the pool may be maintained after the completion of the job for future use by the account (or another account) or work item. For example, it the work item is scheduled for a reoccurrence, it may be efficient to maintain the pool in anticipation of the respawning of the job and keep state (e.g., data files and applications) on the VMs across the running jobs. Further, it is contemplated that using the auto-scaling functionality, the pool may automatically convert dedicated VMs to standby VMs or reduce the number of VMs in response to scaling rules, such as a number of pending tasks on the pool. Further, it is contemplated that a request from the user may be received. The request may include instructions for the deletion of the pool.

Automatically Scaling a Pool and Hierarchical Structuring

Figure 13:
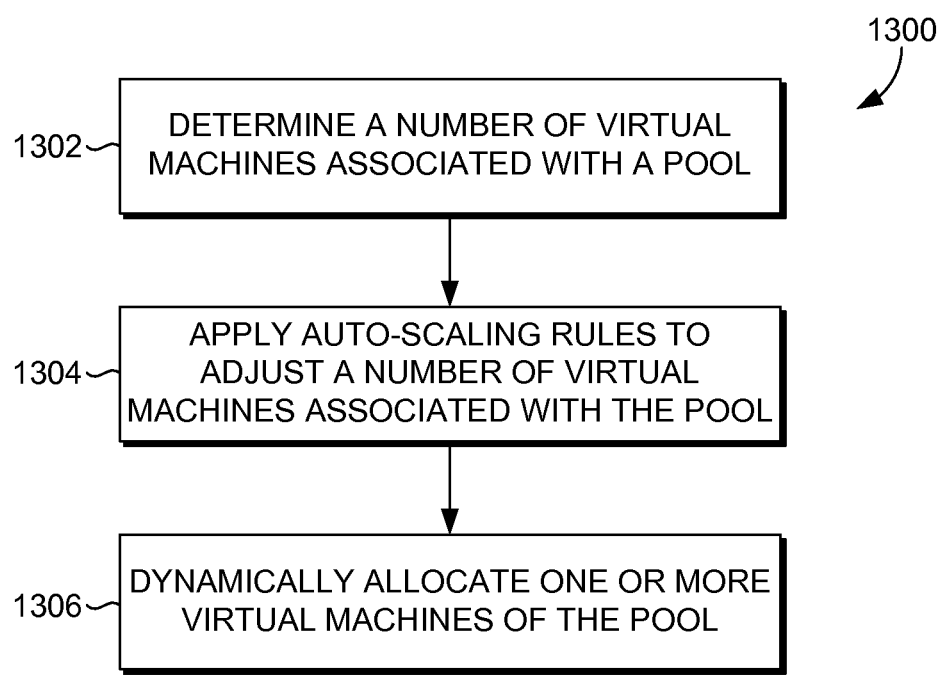
FIG. 13 depicts a block diagram illustrating an additional exemplary method for providing resources in a distributed computing environment, in accordance with aspects of the present invention.

FIG. 13 depicts a block diagram illustrating an exemplary method 1300 for providing resources in a distributed computing environment, in accordance with aspects of the present invention. In particular, it is contemplated that automatically scaling a pool of resources based on rules, requirements, and current resource load allows for the effective provisioning of resources in a distributed computing environment. As previously discussed, a pool may be created by the system (e.g., distributed computing environment) as a set of resource on to which a job is instantiated. However, based on changes in resource demand, scheduling changes, and other variables, it may be desired to increase a size, decrease a size, increase/decrease a particular VM type, and to adjust other variable associated with the pool. Traditionally, this process may be manual in nature and rely on a human intervention to manually adjust a pool resource level.

It is contemplated that automation may be provided to the scaling of resources, such as a pool, to effectively utilize the resources of the system. In an exemplary aspect the method 1300 allows for the auto-scaling of a pool without the intervention of a user. At a block 1302, the system automatically determined a number of virtual machines associated with a pool. The determination may be completed by a pool server. The determination of a number may include determining a total number of virtual machines or determining a total number of a particular type of virtual machine. For example, the determination may be to determine the total number of dedicated VMs in the pool. The determination may be made from a table or other listing maintained by one or more components/modules of the system. For example, it is contemplated that a pool server may maintain a listing of those task tenants having virtual machines used by the pool. Similarly, it is contemplated that a task tenant may maintain a listing of VMs used by a pool (e.g., a task scheduler may maintain such information). Therefore, the determination may be made by referencing one or more source of information already maintained within the system.

At a block 1304, an auto scaling rule is applied to adjust a number of virtual machines associated with the pool. For example, it is contemplated that the number of VMs in total is decreased or increased. Further, it is contemplated that a number of a particular type of VM (e.g., dedicated) is increased or decreased. As previously discussed, the auto-scaling rules may include one or more preferences to aid in determining a size/composition of a pool. For example, the auto-scaling rules may include one or more formula for determining an optimized pool based on current pool statistics and scheduled jobs. The auto-scaling rules may take into account metrics regarding the system, such as job queue statistics (e.g., pending tasks waiting to run, enqueue rate, dequeue rate, task completion rate, etc), spot-pricing information, available resources, efficiency of resources, and the like. Further, it is contemplated that the auto-scaling rules may also take into account a desired completion time for a work item, job, and/or task. Additionally, it is contemplated that the auto-scaling rules may take into account the desired financial resources that are preferred to be expended (e.g., rely on preemptible VMs at a lower cost than dedicated VMs).

As a result of applying the auto-scaling rules to adjust the number of virtual machines associated with the pool, the system may dynamically allocate one or more virtual machines of the pool, as indicated at a block 1306. The dynamic allocation of VMs may include adding one or more VMs, removing one or more VMs, changing a type of one or more VMs. For example, the application of the auto-scaling rules may result in the addition of one or more virtual machines that are dedicated VMs to the pool. Further, it is contemplated that the allocation may include converting free or preemptible VMs to dedicated VMs and reducing the standby count. Other allocations are also contemplated.

The dynamic nature of the allocation is related to the system performing the allocation without user intervention. For example, it is contemplated that the auto-scaling rules may be applied at intervals (e.g., time interval, process count intervals). As a result of automatically running the auto-scaling rules, in this exemplary aspect, the allocation of the resources may occur without a request of a user at the time of allocation or as a direct result of a user input requesting the allocation to be performed.

Figure 14:
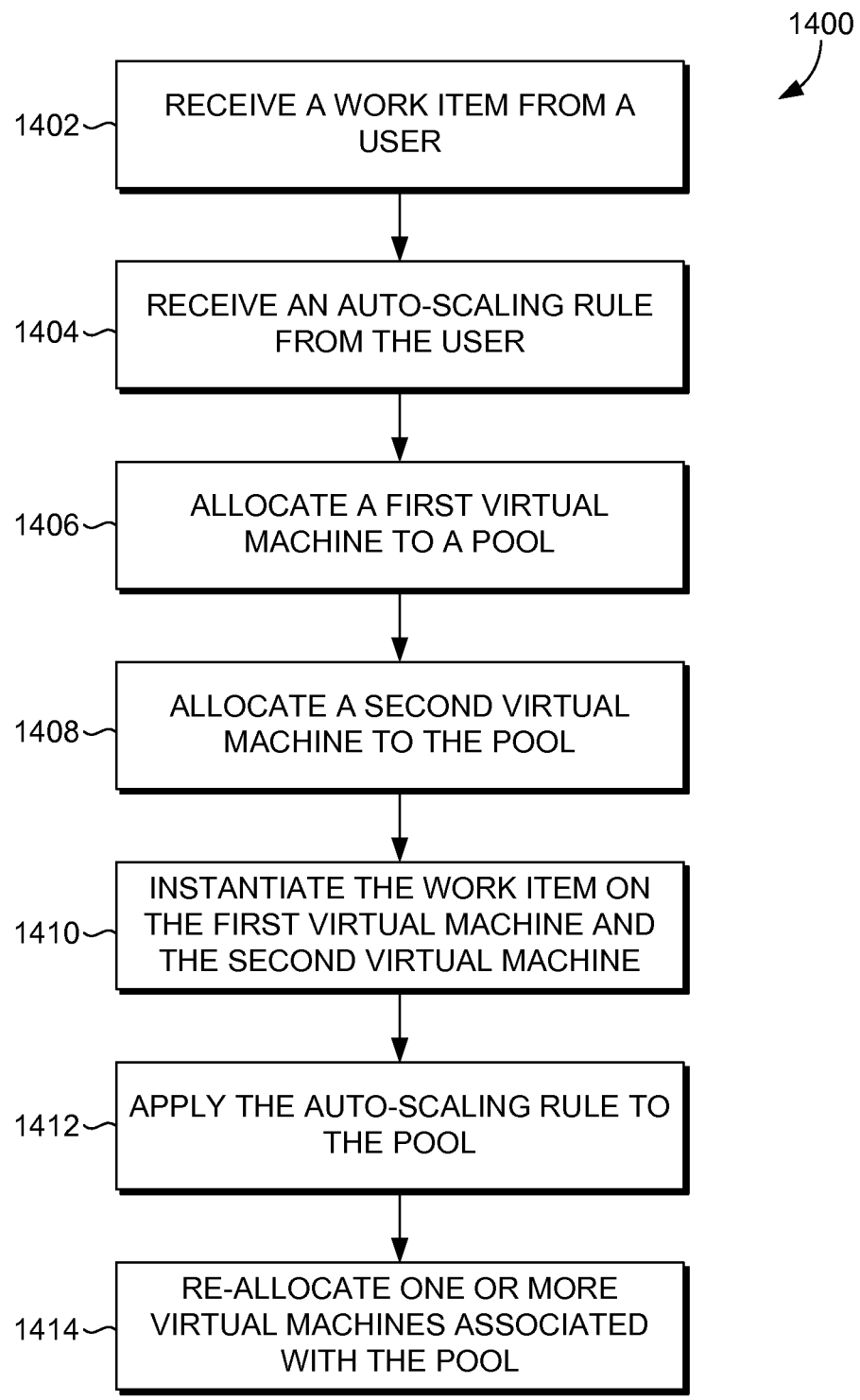
FIG. 14 depicts a block diagram illustrating another method for providing resources in a distributed computing environment, in accordance with aspects of the present invention.

FIG. 14 depicts a block diagram illustrating a method 1400 for providing resources in a distributed computing environment, in accordance with aspects of the present invention. As previously discussed with respect to FIG. 13, it is contemplated that the utilization and application of auto-scaling rules when applied to a pool allows for the providing of resources in a distributed computing environment.

At a block 1402, a work item is received from a user. The user may communicate the work item through an API, which may come via a client portal to a high-level location service of the system. The work item may be associated with a particular task account, which may have account preferences associated therewith. At a block 1404, an auto-scaling rule is received from the user. The auto-scaling rule may provide user preferences with respect to a time for completion of the work item, a priority of the work item, a preferred financial resource expenditure (e.g., prefer preemptible VMs over dedicated VMs). The auto-scaling rules may also include one or more formulas that utilize one or more metrics associated with the pool to aid in scaling the pool in response to demands on the pool.

At a block 1406, a first VM located in a first data center is allocated to a pool. The allocation of the virtual machine may include the adding of the virtual machine as a resource useable within the pool. In an exemplary aspect, the first VM is allocated automatically to the first pool. This is done without user intervention indicated that a VM is to be included in a pool, let alone which VM and which pool. For example, in the past a user may have been required to establish a pool by identifying the resources to be included in the pool. The identification of resources may include identifying a number of VM and from where the VMs are assigned. In this example the system itself identifies that a pool is to be created and that a number of VMs are to be allocated to the pool for the pool to meet a desired performance or operating characteristic.

At a block 1408, a second virtual machine is allocated to the first pool. The second VM is in a second data center that is geographically separate from the first data center. In an exemplary aspect, the second VM may be from a set of VM resources in the same data center, but in a different task tenant. It is contemplated that the second VM is automatically allocated to the first pool without intervention by a user. This automation (and other automatic tasks performed by the system without the intervention of a user) incorporates process and steps that would otherwise not be utilized when a user is allowed to intervene. For example, a determination as to which VM is to be allocated into the first (or any) pool is contemplated within an exemplary embodiment of the present invention.

The first task tenant and the second task tenant may be physically independent data centers (or in a common data center) that service the system. For example, it is contemplated that the first Task tenant may be located in a first geographic location (e.g., at a specific address, city, state, region, country, and/or continent). In one example, it is contemplated that the first task tenant is located in a first region of the United States of America (e.g., Western US) and the second task tenant is located in a different region of the United States of America (e.g., Eastern US). In this example, the first task tenant and the second task tenant are addressable by a common or a different task location service. This allows for the auto-scaling of a pool without intervention of a user into the complexities of growing a pool (or decreasing a pool) that spans across varied data centers. For example, it is contemplated that physical limitation may have previously prevented the expansion of a pool beyond the size of a physical data center. Decoupling the concepts of jobs and pools from schedulers (task tenants) in control of local VM resources allows a pool and its jobs to expand to include resources in two or more data centers without requiring a user to program or otherwise intervene with the system to allow such an expansion. Hence, it is contemplated that a user may design a work item that is able to scale across billions of VMs and across a few VMs based on the system automatically handling the scaling of the pool.

At a block 1410, the work item is instantiated on the first virtual machine and the second virtual machine. The instantiation of a work item may include a scheduler in the task tenant pulling the task off of the queue and assigning it to a VM. The instantiation of a work item may further include scheduling of a task from the work item on the virtual machine. The instantiation may also include the virtual machine pulling a task from a queue for processing of the task. The instantiation may also include the processing of tasks at the virtual machine. Therefore, the instantiating of the work item may include any aspect that results in a portion (e.g., task) of the work item being processed by a VM.

By instantiating the work item's job to a pool that has both the first VM and the second VM, the work item is processed by a pool that scales across multiple data centers without the user altering the work item to accomplish this result. Therefore, it is contemplated that the same work item that is capable of running on a pool served by a single task tenant may also, without user intervention, run on a pool that spans multiple discrete task tenant and data centers.

At a block 1412, the auto-scaling rules are applied to the pool. In an exemplary aspect, the system, without user intervention, automatically initiates the auto-scaling functionality. The auto-scaling rules may take into consideration resources currently being used, resource scheduled to be committed, and resources necessary for the pool, the amount of pending work in the queues for the jobs assigned to the pool, the tasks, the job, and the like. Taken together, the auto-scaling rules allow for the pool to expand, contract, and change VM types.

For example, it is contemplated that if additional tasks are added to the job or the time for processing the job is exceeding initial predictions, the auto-scaling rules may be employed to determine how many additional resources will be required to complete the job. Similarly, it is contemplated that the invocation of the auto-scaling rules may result in a determination that the number of VMs in the pool may be excessive and that some of those resources may be converted or dropped. For example, a dedicated VM may be converted to a preemptible or even a standby VM reservation based on auto-scaling rules. Further, it is contemplated that a VM may be released from the pool entirely as a result of a determination by the auto-scaling rules being applied.

At a block 1414, a re-allocation of one or more VMs associated with the pool occurs. For example, if the auto-scaling rules determine that a dedicated VM may be released from the pool, the dedicated VM may be freed from the pool. Similarly, if the auto-scaling rules determine that the number of available VM is not sufficient to achieve desired results (e.g., timely completion of the job), one or more additional VMs may be allocated to the pool for use in completing the outstanding tasks in the queues or yet to be queued. Further, as previously discussed, it is contemplated that the re-allocation of one or more VM may include converting the VMs from a first type to a second type, in an exemplary aspect. This reallocation is contemplated as being performed, at least in part, by a pool server associated with the pool, in an exemplary aspect.

Decoupled Resource, Scheduling, and Jobs

The decoupling of resources, scheduling, and jobs allows a job to continue execution from one pool of resources to another pool of resource. For example, this functionality may be used when migrating work and load balancing work across different computational resources. In a specific example, if a particular data center fails (e.g., natural disaster), the work may be migrated to a new data center for completion of the job. Further, it is contemplated that the decoupling of resources, scheduling, and jobs allows a job to span execution across several pools of resources and schedules, which may allow the job to achieve a high level of scalability that would not otherwise be obtained. Further, it is contemplated that a pool spans multiple schedulers, tasks tenants, and/or data centers, which allows a job assigned to that pool to also span those resources.

Decoupling contemplates utilizing three separate concepts in the system, in an exemplary aspect. The first concept is based on the concept of pools of virtual machines. The second concept is formed around job management, job state, and job queues. The third concept involves schedulers (e.g., task scheduler 902 of FIG. 9) and the VMs they are responsible for scheduling assigned jobs to for these pools. These concepts allow for a flexible reassignment of jobs, schedulers, and pools based upon load balancing needs of a multi-tenancy distributed computing system. Further, it is contemplated that the three concepts also allow for disaster recovery.

Figure 15:
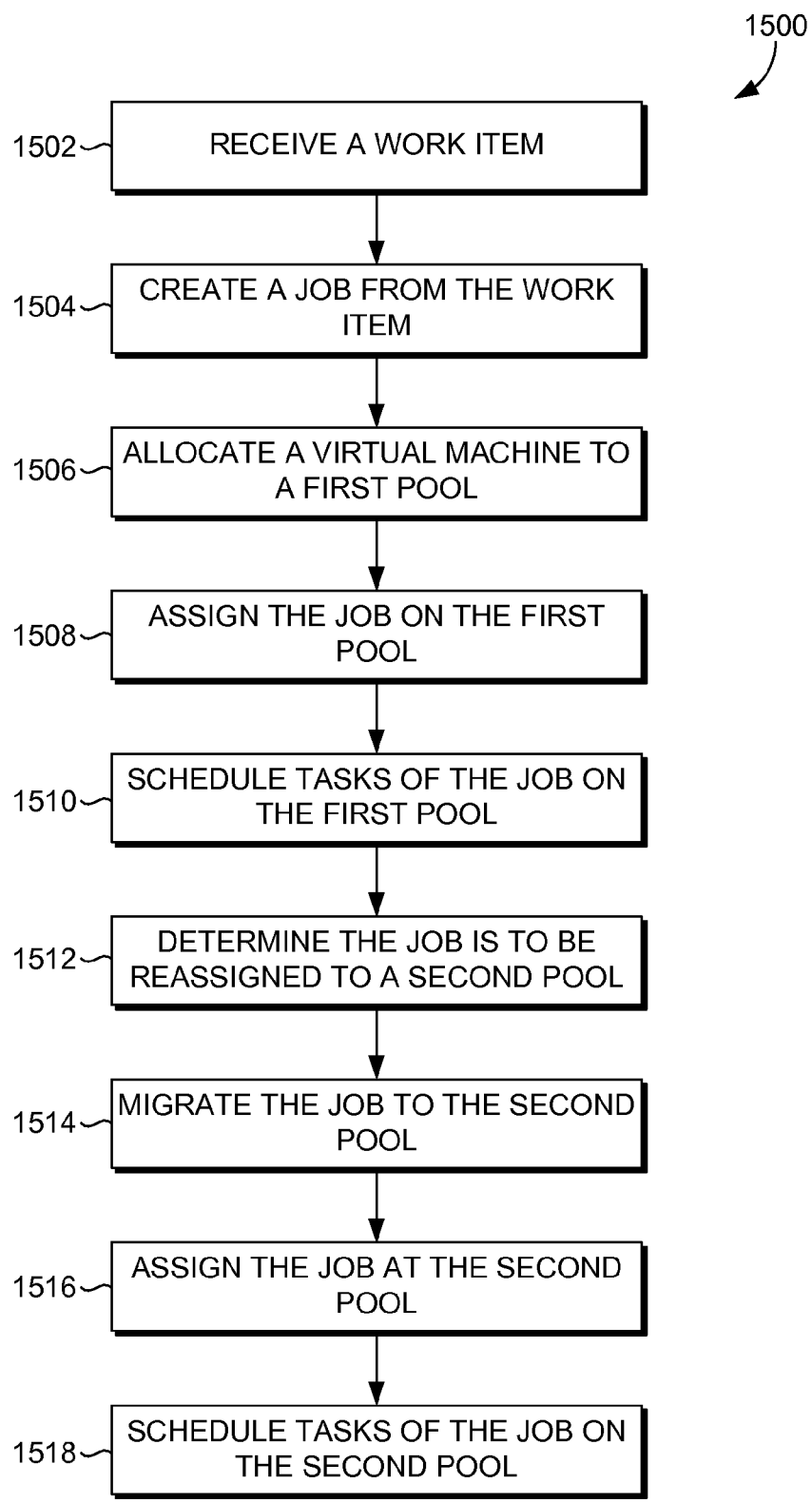
FIG. 15 depicts a block diagram illustrating a method for providing decoupled resource, scheduling, and jobs in a distributed computing environment, in accordance with aspects of the present invention.

FIG. 15 depicts a block diagram illustrating a method 1500 for providing decoupled resource, scheduling, and jobs in a distributed computing environment, in accordance with aspects of the present invention. At a block 1502, a work item is received at the system. For example, the work item may be received at a task location service utilizing a task virtual IP address associated with an account submitting the work item. A job may be created from the work item, as depicted in a block 1504. In an exemplary embodiment, the job creation is the identification that a work item should be processed as a job.

At a block 1506, a virtual machine is allocated to a first pool. For example, it is contemplated that pool server may allocate the VM to the first pool to provide a pool onto which the job may be instantiated (e.g., processed). At a block 1508, the job is assigned to the first pool. For example, it is contemplated that a pool server associated with the first pool has allocated VMs owned by a first task tenant scheduler such that once the job has been assigned to the pool, then the first scheduler can take tasks off the job queue and assign them to the VMs in that pool owned by that scheduler to run the tasks.

At a block 1510, tasks of the job are scheduled to the first pool. As previously discussed, scheduling a task to a pool may include a first task tenant scheduler processing one or more tasks of the job on one or more VMs associated with the pool. Further, it is contemplated that the processes of leasing a task from a job queue is part of instantiating a task. It is contemplated that the scheduler "owns" the VMs and also "owns" the processes that are run on the VMs.

At a block 1512, a determination is made that the job is to be reassigned to a second pool. The second pool may be operatively independent from the first pool, such that a geographically limited disaster resulting in a failure (e.g., tornado, hurricane, earthquake, power grid failure, network failure) does not affect the second pool directly. The determination may also be in response to an auto balancing process that is operative to balance the resource load across two or more pools, task tenants or data centers. For example, certain accounts based in a common location (e.g., New York, N.Y.) may utilize resources at a common time (e.g., start of the financial trading day). In this example, a pool of resource concentrated in an US East geo-region may be more burdened than resource located in a US West geo-region. Therefore, even taking into account latencies and other factors (e.g., affinity), the load balancing process may determine that it is more efficient to migrate one or more portions of the job to the second pool, as indicated at a block 1514. Migration is not limited to the transferring of an "ownership," but instead contemplates merely load balancing across more than one pool, which is the assigning of the job to multiple pools. Further, the concept of migrating includes expanding a pool across different task tenants. As a result, it is possible for a user to have the impression that a job is being performed by a single pool even when that pool covers more than one task tenant.

The migration of a job (or tasks within a job) may include the releasing of a lease on a task in a queue so that a resource in a different pool may obtain the lease of that task. In an alternative embodiment, it is contemplated that the migration of a job entails redistributing the work item to a new task location service for recreation and scheduling in association with resource of the new task service location. The migration of the job is a form of reassigning the job from the first pool to the second pool. At a block 1516, the assigning of the job at the second pool is depicted. At a block 1518, the job is scheduled to be run on the second pool. The scheduler of the first pool may be a WIJ, a task tenant, and a pool server associate with the first pool and the scheduler of the second pool may be a different WIJ, task tenant, and pool server associate with the second pool. Therefore, by not tying the work item/job to a single pool or a single scheduler, the work item may be migrated to a different pool even if the resource associated with the first pool fail.

Further, as previously discussed with connection to FIG. 9 hereinabove, it is contemplated that a task scheduler of a task tenant is a scheduler that is decoupled from pools and work items/jobs of the system. For example, a task scheduler may select tasks from a queue assigned to a pool and control which of the associated VMs in the task tenant scheduled by the task scheduler run the tasks. This concept allows for when a pool spans multiple task tenants for each scheduler associated with each task tenant to pull tasks from queues to be run by VMs owned by each of the task schedulers. Consequently, work items may be run on resources across a pool in a manner that effectively decouples the job (e.g., work items) from the resources (e.g., VMs) from the schedulers (e.g., task schedulers).

Load balancing in the system may then be performed at various levels. For example, load balancing may occur within a common grouping of resources scheduled by a pool server that is in coordination with task tenants (e.g., multiple task tenants within a common geo region served by a common TLS). This common grouping may be a grouping of task tenants. Therefore, it is contemplated that load balancing may be performed at two different levels, in an exemplary aspect. This first level of load balancing may occur among task tenants associated with a common pool server. In this first level of load balancing, the pool server may allocate VMs across different task tenants. A second, higher, level of load balancing may occur across different TLS (e.g., TLS 512 of FIG. 5). At this level of load balancing, the load may also be spread across different pool servers. This type of load balancing may be implemented to result in a migration of load across the system. Yet another level of load balancing contemplated is performed by a WIJ assigning work items/jobs across multiple pools in the system.

As previously discussed, it is contemplated that the migration of a job may include migration of the complete job, a portion of the job yet to be processed, and/or a portion of the job yet to be processed while maintaining some of the portion yet to be processed at the original pool. Therefore, the migration of a job may be useful in both the event of a failure and in response to a load balancing operation.

As provided herein, a variety of modules, components, systems, layers, and processes are discussed. It is contemplated that any one may be performed as a unique machine for transforming information from a first form to a second useable form. This transformation may be effected by a processor and memory that is functional to transform a first input into a second, useable output. Further, virtual machines are discussed herein. As previously discussed, it is contemplated that a virtual machine is functional to process a task with a tangible processor and memory to result in a transformation of the task to a second form that is useable by the system for the benefit of a distributed computing environment.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A computer-implemented method for providing resources in a distributed computing environment, comprising:
    receiving a work item from a user;
    creating a job from the work item;
    automatically, with a processor and memory, allocating at least a first virtual machine to a first pool;
    scheduling the job on the first pool with a first scheduler that is associated with the first pool and leases a task of the job from a job queue, the task being associated with a retry count;
    leasing, with the first scheduler, the task for initiating the job on the first virtual machine of the first pool, wherein the first virtual machine maintains the lease on the task for a duration of time from the job queue;
    executing the task on the first virtual machine, wherein the task is, upon failure, rescheduled on the first virtual machine up to a number of times;
    reassigning the task to a second pool comprised of at least a second virtual machine in response to the number of times corresponding to the retry count during the duration of time, wherein a lease to the task of the job is released from the first scheduler;
    scheduling the task on the second virtual machines on the second pool with a second scheduler that is associated with the second pool and leases the task of the job from the job queue; and
    initiating the task on the second virtual machine of the second pool.

2. The method of claim 1, wherein the scheduling of the job on the first pool is performed, at least in part utilizing the first scheduler that is not utilized to schedule the task on the second pool.

3. The method of claim 1 further comprising detecting a failure in the first pool.

4. The method of claim 3, wherein the reassigning of the task is in response to the detected failure within the first pool.

5. The method of claim 1, wherein the reassigning of the task allows for a continuation of the task on the second pool.

6. The method of claim 1, wherein the retry count is specified with the task.

7. The method of claim 1, further comprising marking the task as completed with an error based on the number of times corresponding to the retry count during the duration of time.

8. The method of claim 1, wherein the reassigning is managed by a high-level location service in communication with one or more task location services associated with the first pool.

9. The method of claim 1, wherein the reassigning the task allows for migration of the job from the first pool to the second pool without user intervention.

10. The method of claim 1, wherein the second virtual machine is in a different geographic location from the first virtual machine.

11. The method of claim 1, wherein the second virtual machine is in a different task tenant from the first virtual machine.

12. The method of claim 1, wherein the number of times corresponding to the retry count during the duration of time comprises the number of times being equal to the retry count.

13. The method of claim 1, wherein the first pool is comprised of two or more task tenants.

14. The method of claim 1, wherein the second virtual machine is allocated to the second pool based, in part, on a specification associated with the work item.

15. The method of claim 1, wherein the first virtual machine and the second virtual machine utilize different physical processors.

16. One or more computer-storage memory devices storing computer-useable instructions that, when executed by a computing device having a processor and memory, perform a method for providing resources in a distributed computing environment, comprising:
  scheduling, with a first scheduler associated with a first pool of resources, a job on the first pool of resources in the distributed computing environment, wherein a task of the job is leased from a job queue, wherein a first virtual machine on the first pool maintains the lease on the task for a duration of time and the task is associated with a retry count;
  executing the task on the first virtual machine on the first pool, wherein the task is, upon failure, rescheduled on the first virtual machine up to a number of times;
  determining in response to the number of times corresponding to the retry count during the duration of time, the task is to migrate from the first pool to a second pool within the distributed computing environment;
  releasing the lease on the task in the job queue from the first virtual machine;
  migrating the task associated with the work item to the second pool;
  scheduling, with a second scheduler associated with the second pool using a processor and memory, the task on a second virtual machine on the second pool, such that the second scheduler acquires a lease on the task; and
  initiating the job on the second virtual machine on the second pool.

17. The one or more computer-storage memory devices of claim 16, wherein the first pool and the second pool are selected by a high-level location service that is in communication with a task location service associated with the first scheduler and in communication with a task location service associated with the second scheduler.

18. The one or more computer-storage memory devices of claim 16, wherein the retry count is specified with the task.

19. The one or more computer-storage memory devices of claim 16, wherein after the migrating, a portion of tasks associated with the job continue to be scheduled on the first pool.

20. A system for providing resources in a distributed computing environment, the system comprising one or more processors configured to perform a method comprising:
  receiving a work item from a user associated with a task account in the distributed computing environment;
  automatically allocating a first virtual machine of the distributed computing environment to a first pool;
  scheduling, with a first scheduler associated with the first pool, a job on the first virtual machine on the first pool, wherein the job is comprised of one or more tasks associated with the work item and the one or more tasks are each associated with a retry count;
  leasing, with the first scheduler, a task of the one or more tasks from a job queue, wherein the first virtual machine maintains the lease on the task for a duration of time from the job queue;
  executing the task on the first virtual machine, wherein the task is, upon failure, rescheduled on the first virtual machine up to a number of times;
  determining in response to the number of times corresponding to the retry count during the duration of time, the task is to migrate to a second pool within the distributed computing environment;
  releasing the lease of the task from the first virtual machine;
  migrating the task associated with the work item to the second pool;
  scheduling, with a second scheduler associated with the second pool, the task on a second virtual machine on the second pool; and
  leasing, with the second scheduler, the task for initiating on the second pool.

* * * * *